United States Patent
Fujita et al.

(10) Patent No.: US 10,809,903 B2
(45) Date of Patent: Oct. 20, 2020

(54) INFORMATION PROCESSING APPARATUS, INFORMATION PROCESSING METHOD, AND PROGRAM FOR DEVICE GROUP MANAGEMENT

(71) Applicant: SONY CORPORATION, Tokyo (JP)

(72) Inventors: Koji Fujita, Tokyo (JP); Satoshi Asai, Saitama (JP); Naohiro Uriya, Kanagawa (JP); Kenichiro Takyu, Tokyo (JP); Minako Kawata, Tokyo (JP); Hisanori Nagata, Tokyo (JP); Takashi Onohara, Tokyo (JP); Ryo Sokabe, Saitama (JP); Naoki Yuasa, Chiba (JP); Takuma Higo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 15/526,508

(22) PCT Filed: Oct. 26, 2015

(86) PCT No.: PCT/JP2015/005362
§ 371 (c)(1),
(2) Date: May 12, 2017

(87) PCT Pub. No.: WO2016/103546
PCT Pub. Date: Jun. 30, 2016

(65) Prior Publication Data
US 2017/0315715 A1    Nov. 2, 2017

(30) Foreign Application Priority Data

Dec. 26, 2014    (JP) .................................. 2014-264590

(51) Int. Cl.
*G06F 3/0484*    (2013.01)
*G06F 3/0486*    (2013.01)
(Continued)

(52) U.S. Cl.
CPC ........ *G06F 3/04847* (2013.01); *G06F 3/0482* (2013.01); *G06F 3/0486* (2013.01);
(Continued)

(58) Field of Classification Search
CPC ............. G06F 3/04847; G06F 3/04886; G06F 3/04815; G06F 3/0482; G06F 13/00; G06F 3/0486; H04L 41/22; H04Q 9/00
See application file for complete search history.

(56) References Cited

U.S. PATENT DOCUMENTS 6,253,114 B1 * 6/2001 Takihara .............. G11B 27/002
700/17
2007/0274520 A1 * 11/2007 Ogata ................. H04L 63/0435
380/201
(Continued)

FOREIGN PATENT DOCUMENTS

CN    103329087 A    9/2013
JP    2002-199474 A    7/2002
(Continued)

OTHER PUBLICATIONS

Deceptively Blonde, Fix for Windows 8.1 Wifi not Working, Jul. 4, 2014, deceptivelyblonde.com, pp. 1-6 (Year: 2014).*
(Continued)

*Primary Examiner* — Daniel W Parcher
(74) *Attorney, Agent, or Firm* — Oblon, McClelland, Maier & Neustadt, L.L.P.

(57) ABSTRACT

An information processing apparatus according to an embodiment of the present technology includes a detection unit, an acceptance unit, and an image control unit. The detection unit is capable of detecting whether or not each of a plurality of reproduction apparatuses constitutes a group related to reproduction of content, each of the plurality of reproduction apparatuses being connected to a network,
(Continued)

each of the plurality of reproduction apparatuses being capable of reproducing the content. The acceptance unit accepts a user operation related to constitution of the group. The image control unit outputs a group state image on the basis of a detection result by the detection unit, the group state image representing a constitution state of the group, the group state image including an image of each of the plurality of reproduction apparatuses, and controls the group state image in response to the accepted user operation related to constitution of the group.

15 Claims, 19 Drawing Sheets

(51) Int. Cl.
*G06F 13/00* (2006.01)
*G06F 3/0482* (2013.01)
*G06F 3/0488* (2013.01)
*H04L 12/24* (2006.01)
*H04Q 9/00* (2006.01)
*G06F 3/0481* (2013.01)

(52) U.S. Cl.
CPC ...... *G06F 3/04815* (2013.01); *G06F 3/04886* (2013.01); *G06F 13/00* (2013.01); *H04L 41/22* (2013.01); *H04Q 9/00* (2013.01)

(56) References Cited

U.S. PATENT DOCUMENTS

| | | | |
|---|---|---|---|
| 2010/0064225 A1* | 3/2010 | Cunningham | H04L 41/12 715/736 |
| 2010/0299639 A1* | 11/2010 | Ramsay | G06F 3/0486 715/835 |
| 2012/0137346 A1* | 5/2012 | Lee | G06F 21/606 726/4 |
| 2012/0185789 A1* | 7/2012 | Louch | G06F 3/0488 715/769 |
| 2013/0080955 A1 | 3/2013 | Reimann et al. | |
| 2013/0311912 A1 | 11/2013 | Aso et al. | |
| 2016/0253145 A1* | 9/2016 | Lee | G06F 3/04883 381/79 |

FOREIGN PATENT DOCUMENTS

| | | |
|---|---|---|
| JP | 2005-204753 A | 8/2005 |
| WO | 2013/014874 A1 | 1/2013 |
| WO | 2013/049346 A1 | 4/2013 |

OTHER PUBLICATIONS

International Search Report dated Jan. 26, 2016, in PCT/JP2015/005362, filed Oct. 26, 2015.
Japanese Office Action dated Aug. 6, 2019 in Japanese Patent Application No. 2016-565867, citing document AO therein, 6 pages.
Combined Chinese Office Action and Search Report dated Oct. 8, 2019 in corresponding Chinese Patent Application No. 201580061826.1(with English Translation) citing document AO therein, 33 pages.

\* cited by examiner

INFORMATION PROCESSING APPARATUS, INFORMATION PROCESSING METHOD, AND PROGRAM FOR DEVICE GROUP MANAGEMENT

TECHNICAL FIELD

The present technology relates to an information processing apparatus, an information processing method, and a program for controlling a reproduction apparatus connected to a network.

BACKGROUND ART

A system in which a home network is established in a house and content such as music and video is reproduced by a plurality of AV (Audio & Visual) apparatuses connected thereto has been known. For example, in Patent Literature 1, a system in which a plurality of AV apparatuses placed in a plurality of rooms are connected to an IEEE (Institute of Electrical and Electronics Engineers) 1394 network is disclosed. In this system, groups are defined corresponding to the rooms in which the AV apparatuses are placed, and the corresponding AV apparatus is displayed for each group on a display screen of an IR (Infrared) remote controller. Accordingly, the selection work of the AV apparatus is made more efficient (e.g., paragraphs 0033 to 0035 of the specification of Patent Literature 1).

CITATION LIST

Patent Literature

Patent Literature 1: Japanese Patent Application Laid-open No. 2002-199474

DISCLOSURE OF INVENTION

Technical Problem

In the above-mentioned system, a technology that is capable of controlling reproduction of content by a plurality of reproduction apparatuses connected to a network with a good operability is desired.

In view of the circumstances as described above, it is an object of the present technology to provide an information processing apparatus, an information processing method, and a program that are capable of controlling reproduction of content by a plurality of reproduction apparatuses connected to a network with a good operability.

Solution to Problem

In order to achieve the above-mentioned object, an information processing apparatus according to an embodiment of the present technology includes a detection unit, an acceptance unit, and an image control unit.

The detection unit is capable of detecting whether or not each of a plurality of reproduction apparatuses constitutes a group related to reproduction of content, each of the plurality of reproduction apparatuses being connected to a network, each of the plurality of reproduction apparatuses being capable of reproducing the content.

The acceptance unit accepts a user operation related to constitution of the group.

The image control unit outputs a group state image on the basis of a detection result by the detection unit, the group state image representing a constitution state of the group, the group state image including an image of each of the plurality of reproduction apparatuses, and controls the group state image in response to the accepted user operation related to constitution of the group.

In this information processing apparatus, whether or not each of a plurality of reproduction apparatuses connected to a network constitutes a group is detected. A group state image including an image of each of the plurality of reproduction apparatuses is output on the basis of a detection result, and the group state image is controlled in response to a user operation. Accordingly, the user is capable of controlling reproduction of content with a good operability while watching the group state image.

The image control unit may display, when a reproduction apparatus constituting the group is detected, an image of the group including the reproduction apparatus in the group state image.

Accordingly, it is possible to easily know whether or not a group is established at present.

The group may be a group that is capable of reproducing the same content at the same time.

By using the present technology, it is possible to control simultaneous reproduction of content by the group with a good operability.

The acceptance unit may accept a first operation of selecting an image of one of the plurality of reproduction apparatuses. In this case, the image control unit may emphatically display an image of a reproduction apparatus that is capable of constituting the group, in response to the first operation.

Accordingly, it is possible to easily know an apparatus that is capable of constituting a group and perform creation of a group and the like with a good operability.

The acceptance unit may accept a second operation of causing an image of a non-constitution apparatus that is capable of constituting the group to move in the group state image while selecting the image of the non-constitution apparatus, the non-constitution apparatus being a reproduction apparatus that does not constitute the group. In this case, the image control unit may display, when a destination of the second operation is an image of the reproduction apparatus that is capable of constituting the group, an image of a group that is newly constituted of the selected non-constitution apparatus and the reproduction apparatus as the destination.

Accordingly, it is possible to create a group with a simple operation.

The image control unit may display, when a destination of the second operation is an image of a group that is already established, an image of a group that is newly constituted of the selected non-constitution apparatus and the reproduction apparatus included in the group as the destination.

Accordingly, it is possible to add the non-constitution apparatus to a group with a simple operation.

The image control unit may cause, when a destination of the second operation is a position where there is no image of another reproduction apparatus, an image of the selected non-constitution apparatus to move to the position.

Accordingly, it is possible to cause a reproduction apparatus to move in the group state image with a simple operation.

The image control unit may return, when a destination of the second operation is an image of a reproduction apparatus that is not capable of constituting the group, an image of the selected non-constitution apparatus to its original position.

Accordingly, it is possible to easily know that a group cannot be created and the like, and improve the operability.

The acceptance unit may accept a third operation of causing an image of a group apparatus to move in the group state image while selecting the image of the group apparatus, the group apparatus being a reproduction apparatus that constitutes the group. In this case, the image control unit may display, when a destination of the third operation is a position that is away from an image of the group including the selected group apparatus, an image where the group apparatus is withdrawn from the group.

Accordingly, it is possible to cause the group apparatus to withdraw from the group with a simple operation.

The image control unit may identifiably display one of a plurality of group apparatuses included in the group as a master apparatus, and display, when an image of the master apparatus is selected and moved to the position that is away from the image of the group by the third operation, an image where the group is dissolved.

Accordingly, it is possible to dissolve the group with a simple operation.

The acceptance unit may accept a fourth operation of selecting an image of the group. In this case, the image control unit may output a reproduction information image including information related to reproduction of the content by a plurality of group apparatuses included in the group, in response to the fourth operation.

Accordingly, it is possible to perform reproduction setting and the like for each group with a simple operation.

The reproduction information image may include information on content that the plurality of group apparatuses are capable of reproducing at the same time.

Accordingly, it is easily know content that can be reproduced for each group.

The image control unit may display meta-information related to content that is being reproduced by the plurality of group apparatuses in the group state image.

Accordingly, it is possible to know information of content.

The acceptance unit may be a touch panel. In this case, the group state image may be displayed on the touch panel.

It is possible to control reproduction of content with a good operability by using the touch panel.

An information processing method according to an embodiment of the present technology includes detecting whether or not each of a plurality of reproduction apparatuses constitutes a group related to reproduction of content, each of the plurality of reproduction apparatuses being connected to a network, each of the plurality of reproduction apparatuses being capable of reproducing the content.

A user operation related to constitution of the group is accepted.

A group state image is controlled on the basis of a detection result by the detection unit, the group state image representing a constitution state of the group, the group state image including an image of each of the plurality of reproduction apparatuses, and controlling the group state image in response to the accepted user operation related to constitution of the group.

A program according to an embodiment of the present technology causes a computer to execute the following steps of:

detecting whether or not each of a plurality of reproduction apparatuses constitutes a group related to reproduction of content, each of the plurality of reproduction apparatuses being connected to a network, each of the plurality of reproduction apparatuses being capable of reproducing the content;

accepting a user operation related to constitution of the group; and outputting a group state image on the basis of a detection result by the detection unit, the group state image representing a constitution state of the group, the group state image including an image of each of the plurality of reproduction apparatuses, and controlling the group state image in response to the accepted user operation related to constitution of the group.

Advantageous Effects of Invention

As described above, in accordance with the present technology, it is possible to control reproduction of content by a plurality of reproduction apparatuses connected to a network with a good operability. It should be noted that the effect described here is not necessarily limitative and may be any effect described in the present disclosure.

MODE(S) FOR CARRYING OUT THE INVENTION

Hereinafter, embodiments according to the present technology will be described with reference to the drawings.

Network System

Figure 1:
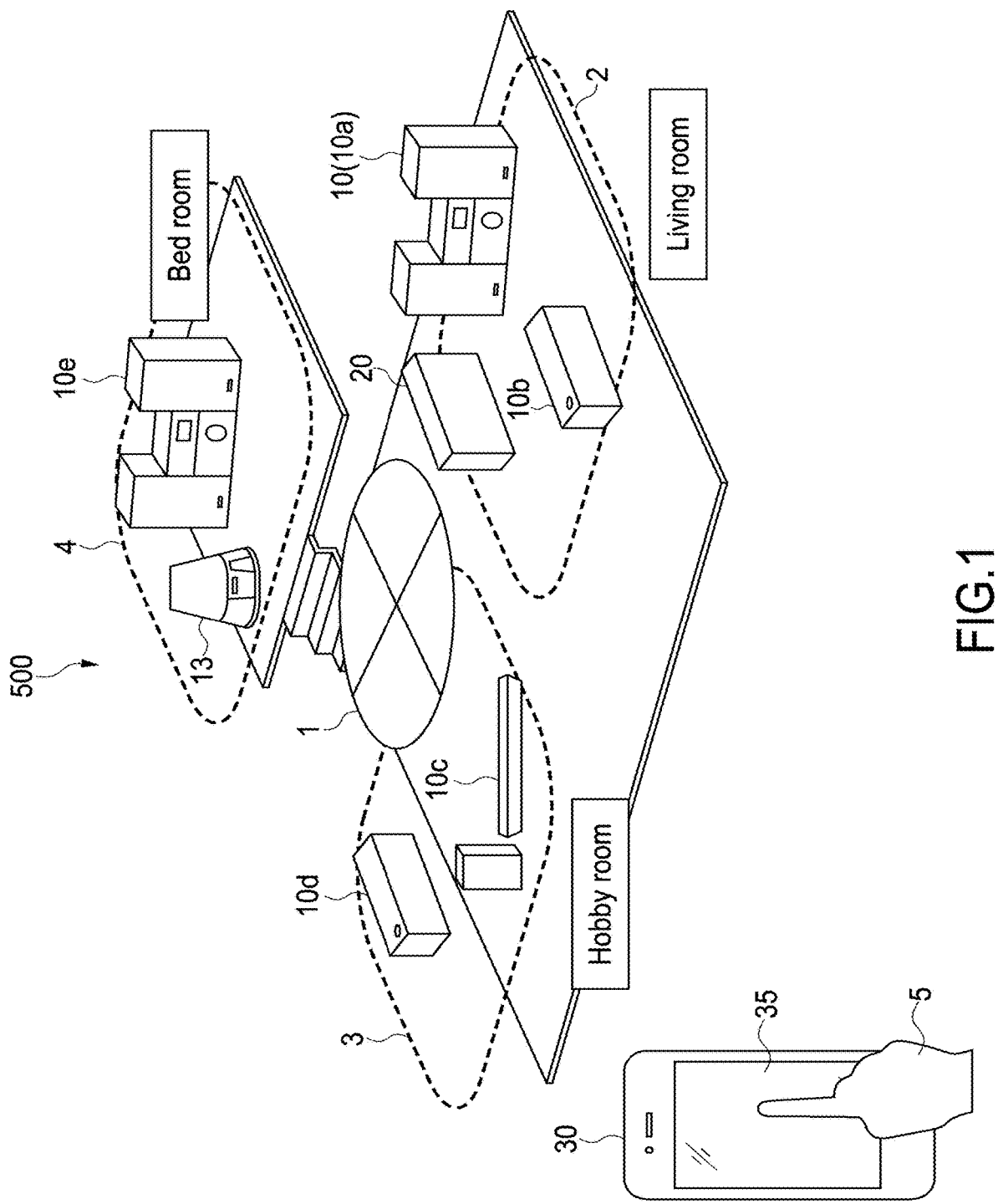
FIG. 1 A schematic diagram showing a configuration example of a network system according to an embodiment.

FIG. 1 is a schematic diagram showing a configuration example of a network system according to an embodiment of the present technology. A network system 500 includes a home network 1 established in a house, a plurality of reproduction apparatuses 10 connected thereto, a server apparatus 20 that provides content, and a portable terminal 30 that functions as an information processing apparatus according to this embodiment.

As the home network 1, for example, a network conforming to the DLNA (Digital Living Network Alliance) standard is used. In this case, the plurality of reproduction apparatuses 10 each function as a DMR (Digital Media Renderer), and the server apparatus 20 functions as a DMS (Digital Media Server). Further, the portable terminal 30 functions as a DMC (Digital Media Controller). However, it is not limited to this configuration, and a network using another protocol may be used, for example.

The plurality of reproduction apparatuses 10, the server apparatus 20, and the portable terminal 30 are connected to the home network 1 via, for example, an access point (not shown) through wireless communication such as WiFi. However, the method of connecting to the home network 1 is not limited, and wired communication via a LAN cable or the like may be used.

As shown in FIG. 1, the plurality of reproduction apparatuses 10 are placed in rooms of a living room 2, a hobby room 3, and a bed room 4. By operating the portable terminal 30, a user 5 is capable of instructing the respective reproduction apparatuses 10 placed in the rooms to reproduce content in the server apparatus 20. In this embodiment, music content is reproduced by the plurality of reproduction apparatuses 10. However, the present technology is not limited to the reproduction of music content, and can be applied to reproduction of various kinds of content such as video. Note that the number of reproduction apparatuses 10 is not limited.

As each of the reproduction apparatuses 10, one that is capable of operating as a DMP (Digital Media Player) may be placed. In this case, by operating a UI (User Interface) of the respective reproduction apparatuses 10, it is possible to reproduce content in the server apparatus 20.

As each of the reproduction apparatuses 10, for example, a television receiver, a PC (Personal computer), an audio video receiver, a video monitor, a home video game machine, or the like is used. As the server apparatus 20, for example, a PC, a network-ready HDD (NAS) or the like is used. As the portable terminal 30, typically, a smartphone is used. However, it is not limited thereto, and various PDAs (Personal Digital Assistant) such as a tablet terminal and a game machine.

Note that in this embodiment, a reproduction apparatus that is not connected to the home network 1 (hereinafter, referred to as non-network apparatus) 13 is placed in the bed room 4 in FIG. 1. The non-network apparatus 13 does not function as a DMR, and reproduces a CD, content read via a USB (Universal Serial Bus), or content acquired from another global network or the like. In this embodiment, it is possible to control the operation of the non-network apparatus 13 by the portable terminal 30 through near field communication such as Bluetooth (registered trademark).

Configuration of Portable Terminal

Figure 2:
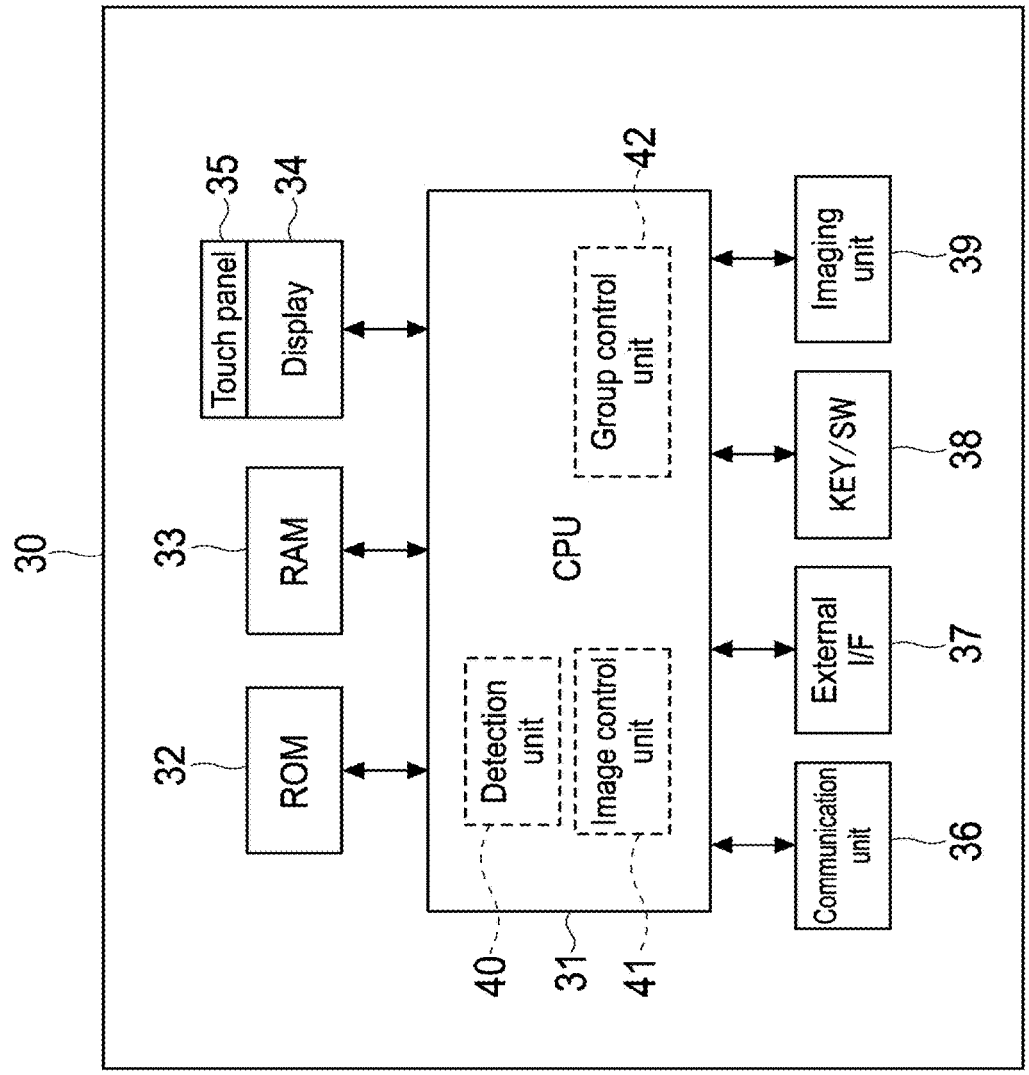
FIG. 2 A block diagram showing a configuration example of the portable terminal shown in FIG. 1.

FIG. 2 is a block diagram showing a configuration example of the portable terminal 30. The portable terminal 30 includes a CPU (Central Processing Unit) 31, a ROM (Read Only Memory) 32, a RAM (Random Access Memory) 33, a display 34, and a touch panel 35. Further, the portable terminal 30 includes a communication unit 36, an external I/F (interface) 37, a key/switch 38, and an imaging unit 39.

The CPU 31 exchanges signals with respective blocks of the portable terminal 30 to perform various kinds of operations, and collectively controls various kinds of processing performed in the portable terminal 30 such as instruction for the reproduction apparatuses 10 to reproduce content and display of an image on the display 34 (the touch panel 35).

The ROM 32 stores various kinds of data processed by the CPU 31 such as various kinds of image data and metadata, and various programs such as an application. The RAM 32 is used as a working area of the CPU 31. When a program such as an application is executed, various kinds of data necessary for the execution are loaded into the RAM 32.

Instead or in addition to the ROM 32, an HDD (Hard Disk Drive), a flash memory, or another non-volatile memory such as a solid-state memory may be provided. Then, in these storage devices, the above-mentioned various kinds of data or programs may be stored.

The display 34 is a display device using a liquid crystal, an EL (Electro-Luminescence), or the like. As shown in FIG. 2, the display 34 is integrally formed with the touch panel 35. Therefore, various GUIs (Graphical User Interface) are displayed on the touch panel 35, and a touch operation can be input with respect to the GUI. The touch panel 35 functions as an acceptance unit in this embodiment.

The communication unit 36 is an interface for connecting the portable terminal 30 to the home network 1 or the non-network apparatus 13. For example, as the communication unit 36, a wireless LAN module such as WiFi or short-distance wireless module such as Bluetooth (registered trademark) is provided.

The external I/F 37 is an interface for connecting to an external apparatus on the basis of the standards such as a USB and an HDMI (registered trademark) (High-Definition Multimedia Interface). In addition, an interface for connecting to various memory cards such as a memory stick may be configured.

The key switch unit 38 accepts, particularly, an operation performed by the user 5, which cannot be input via the touch panel 35, such as a power supply switch and a short cut key. The imaging unit 39 includes, for example, a CMOS (Complementary Metal Oxide Semiconductor) or CCD (Charge Coupled Devices) sensor, and generates a digital image of an object.

The information processing performed by the portable terminal 30 having the above-mentioned hardware configuration is achieved by cooperation of software stored in the ROM 32 or the like and a hardware resource of the portable terminal 30. For example, by the CPU 31 loading the program (application) according to the present technology stored in the ROM 32 or the like into the RAM 33 to execute it, the information processing method according to the present technology is achieved. At this time, as shown in FIG. 2, the CPU 31 functions as a detection unit 40, an image control unit 41, and a group control unit 42. In order to achieve these blocks, dedicated hardware may be appropriately used.

The program such as an application is installed in the portable terminal 30 from, for example, a global network. Alternatively, the program may be installed in the portable terminal 30 via a recording medium.

Multi-Room Reproduction

As the operation of the portable terminal 30 according to this embodiment, multi-room reproduction of content will be described. The multi-room reproduction is a reproduction method in which a group is constituted of two or more reproduction apparatuses 10 connected to the home network 1 and the group simultaneously reproduces the same content.

For example, by causing the plurality of reproduction apparatuses 10 in the same room to reproduce the same content, it is possible to enjoy music in the entire room at a high volume. Alternatively, for example, in the case where many friends are invited and a party is held, it is possible to liven up the party by causing the reproduction apparatuses 10 placed in the rooms to reproduce the same content and simultaneously controlling the operations.

In this embodiment, one of the two or more reproduction apparatuses 10 constituting the group is set as a master apparatus, and other reproduction apparatuses 10 are set as slave apparatuses. When the multi-room reproduction is performed, the instruction is transmitted to the master apparatus. The master apparatus downloads content from the server apparatus 20, and simultaneously performs streaming distribution on the slave apparatus. Accordingly, the multi-room reproduction of content is achieved. Note that the method of achieving the multi-room reproduction is not limited, and an arbitrary technology related to, for example, synchronous reproduction, may be appropriately used.

In the present technology, as will be described later, the current constitution state of the group is perspectively displayed on the touch panel 35 of the portable terminal 30. Then, on the basis of the image, it is possible to newly create a group, dissolve the group, make a new addition to the group, or withdraw from the group with a good operability. Therefore, it is possible to control the multi-room reproduction of content with a good operability.

Figure 3:
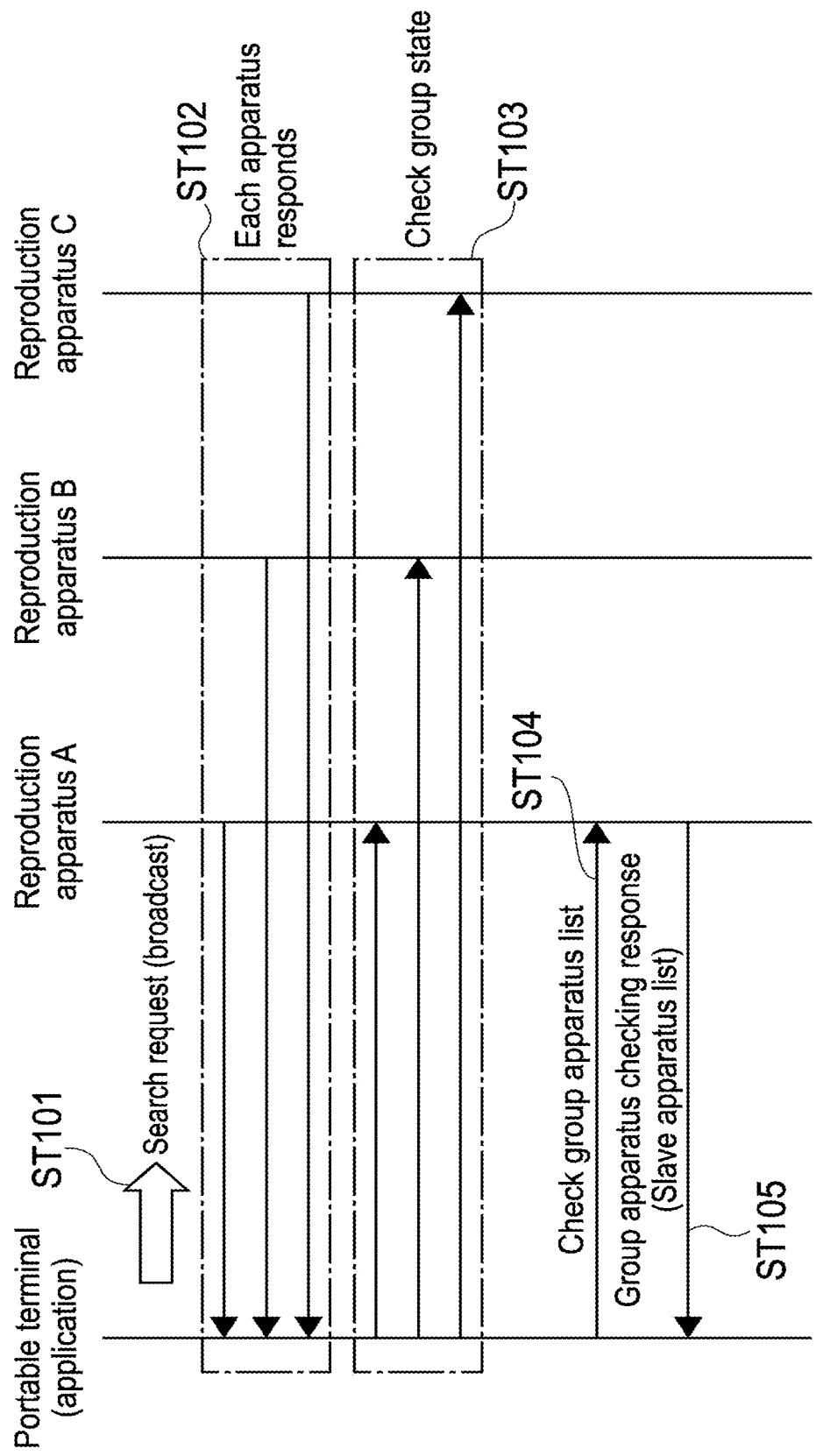
FIG. 3 A sequence diagram showing an operational example to when a group state image is output.

FIG. 3 is a sequence diagram showing an operational example to when a group state image showing the constitution state of a group is output. In FIG. 3, as the reproduction apparatus connected to the home network 1, three reproduction apparatuses A to C are shown, in order to make the figure simple.

When an application is activated by the user 5, the detection unit 40 of the portable terminal 30 generates a search request for finding the reproduction apparatus 10, and the search request is transmitted on the home network 1 by broadcast (Step 101). The reproduction apparatuses A to C each transmit a response to the search request to the portable terminal 30 (Step 102). The response includes information that represents whether or not it is a multi-room-ready apparatus.

The multi-room-ready apparatus is the reproduction apparatus 10 that is capable of constituting a group and performing the multi-room reproduction. The reproduction apparatus 10 that cannot perform the multi-room reproduction is a non-ready apparatus. Specifically, in Step 102, information on whether or not it is capable of constituting a group is transmitted to the portable terminal 30.

The detection unit 40 makes an inquiry about the group state to the multi-room-ready apparatus (reproduction apparatuses A to C in this example) (Step 103). The group state is information that represents whether or not it constitutes a group or it is a master apparatus or slave apparatus in the case where it constitutes a group.

With the search request in Step 101 and the inquiry about the group state in Step 103, the detection unit 40 of the portable terminal 30 is capable of detecting whether or not each of the plurality of reproduction apparatuses 10 that are connected to the home network 1 and capable of reproducing content constitutes a group for the multi-room reproduction. Note that a control message or the like of, for example, UPnP (Universal Plug and Play) for this detection is transmitted on the home network 1. It goes without saying that it is not limited thereto, and another arbitrary technology may be used to perform the detection.

The detection unit 40 makes an inquiry about checking a list of the group apparatus to the master apparatus (reproduction apparatus A in this example) (In Step 104). The group apparatus is the reproduction apparatus 10 constituting a group. The master apparatus transmits a list of the slave apparatus that belongs to the group in response to the inquiry (Step 105).

The detection unit 40 is capable of determining the current group constitution state on the basis of the acquired information. The image control unit 41 outputs a group state image on the basis of the determination result. Note that a unique ID is set on each reproduction apparatus, and thus, the reproduction apparatus can be identified.

Figure 4:
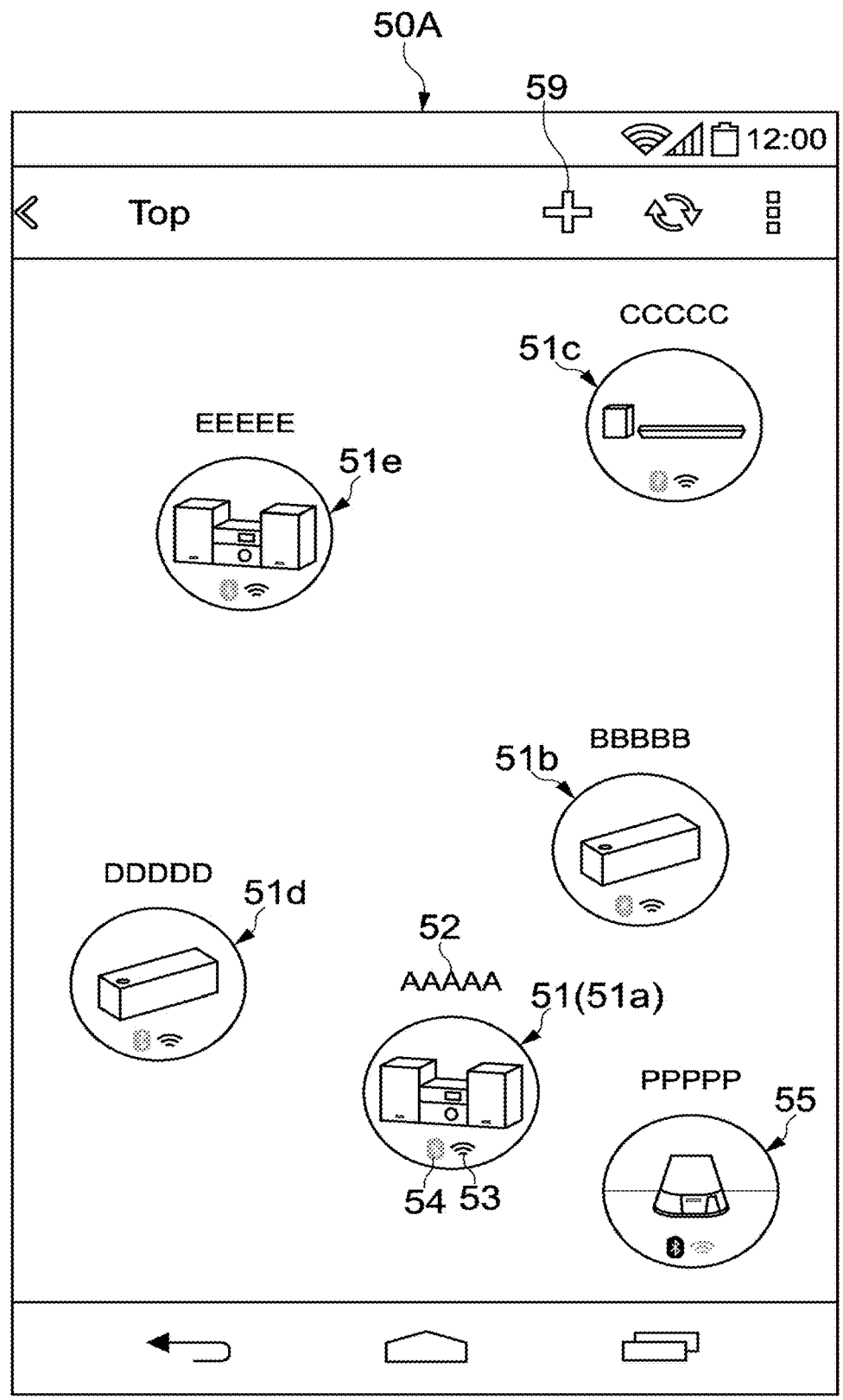
FIG. 4 A diagram showing a configuration example of the group state image in the case where a group is not established.
Figure 5:
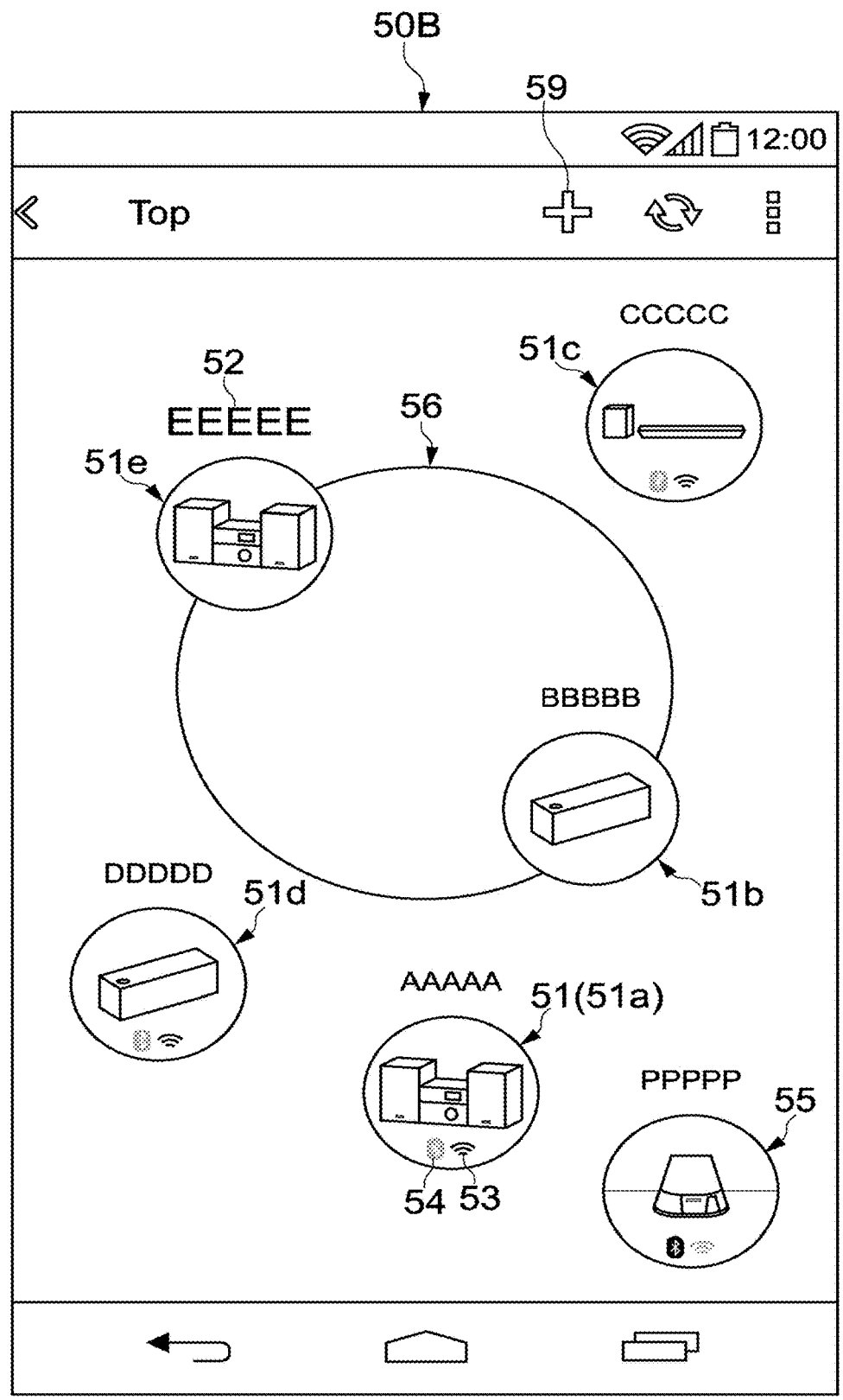
FIG. 5 A diagram showing a configuration example of the group state image in the case where a group is established.

FIG. 4 and FIG. 5 are each a diagram showing a configuration example of a group state image 50 displayed on the touch panel 35. FIG. 3 shows a group state image 50A in which a group is not established, and FIG. 4 shows a group state image 50B in which a group is established.

As shown in FIG. 4 and FIG. 5, the group state image 50 includes icon images 51 of the plurality of reproduction apparatuses 10 connected to the home network 1. On the icon images 51, respective images depending on the kind of the reproduction apparatus are displayed. Icon images 51a to 51d shown in FIG. 4 and FIG. 5 respectively correspond to reproduction apparatuses 10a to 10d shown in FIG. 1.

Each icon image 51 includes a text image 52 that represents a name, for example. Accordingly, it is possible to know the correspondence with the actual reproduction apparatus 10 placed in each room. Further, on each icon image 51, a network mark 53 (WiFi mark in this example) that represents the connection form with the portable terminal 30 and an individual communication mark 54 (Bluetooth (registered trademark) mark in this example) are placed. The network mark 53 is actively displayed on the reproduction apparatus 10 connected to the home network 1.

The group state image 50 includes an icon image 55 of the non-network apparatus 13 that is not connected to the home network 1. Also on the icon image 55, the text image 52, the network mark 53, and the individual communication mark 54 are placed. The individual communication mark 54 is actively displayed on the non-network apparatus 13. Alternatively, information indicating that it is the non-network apparatus 13 may be displayed.

For example, by selecting a plus mark 59 or the like in the group state image 50, detection of the non-network apparatus 13 is performed and the icon image 55 thereof is displayed in the case where it is detected. The detection of the non-network apparatus 13 may be automatically performed.

In this embodiment, it is possible to collectively display the reproduction apparatuses 10 and 13 in the surrounding environment on the touch panel 35. Accordingly, it is possible to control reproduction of content with a good operability. Note that the non-network apparatus 13 cannot perform the multi-room reproduction.

As shown in FIG. 5, in the case where a group is already established, i.e., a group apparatus is detected, a group image 56 of a group including the group apparatus is displayed. The group image 56 is a circular image, and the icon images 51 of the group apparatuses that belong to the group are displayed on the periphery of the group image 56. In the example shown in FIG. 5, the reproduction apparatuses 10b and 10d shown in FIG. 1 are detected as the group apparatus, and the icon images 51b and 51e thereof are placed in the periphery of the group image 56.

When the group image 56 is displayed, the icon image 51 (icon image 51e in this example) of the reproduction apparatus 10 as the master apparatus is emphatically displayed so that the master apparatus can be identified. The method of emphatically displaying the icon image 51 is not limited, and the text image 52 is largely displayed, for example, as shown in FIG. 5. It goes without saying that it is not limited thereto, and an arbitrary display method such as emphasizing the color of the icon image 51 and blinking the icon image 51 may be employed. Note that information indicating that it is the master apparatus may be newly added.

As shown in FIG. 5, display of the network mark 54 or the like of the icon image 51 placed in the periphery of the group image 56 may be omitted because it is obvious that it is connected to the home network 1. Note that in the case where a plurality of groups are established, a plurality of group images 56 corresponding to the groups are displayed.

The method and technology of generating the group state image 50 are not limited, and an arbitrary method and technology may be used. For example, in Steps 102, 103, or the like in FIG. 3, device information including the above-mentioned information related to the group constitution and information for generating the group state image 50 is acquired. The device information may include the icon image of each reproduction apparatus 10, and the icon image 51 may be used. Information on the name or the like is extracted from the device information, and the text image 52 is generated on the basis of the information.

Alternatively, the icon images 51 is stored on the side of the portable terminal 30, and the optimal icon image 51 may be selected on the basis of the acquired device information. Alternatively, via a global network such as the Internet, an image or information for generating the group state image 50 such as the icon image 51 may be acquired.

The design or the like of the icon image 51 or the group image 56 and the layout of the group state image 50 are not limited to those shown in FIG. 4, FIG. 5 and the like, and may be appropriately set.

The user 5 is capable of inputting various operations related to the constitution of a group to the group state image 50 displayed on the touch panel 35. The image control unit 41 controls the group state image 50 in response to the operation accepted by the touch panel 35.

For example, in the case where an operation of newly creating a group, making new addition, or the like is input, the group control unit 42 shown in FIG. 2 transmits a request or instruction depending on the operation to the master apparatus. The master apparatus operates in response to the request or the like, and returns the result to the group control unit 42. The image control unit 41 controls the group state image 50 on the basis of the information.

The detection unit 40 may make an inquiry about the group state at predetermined timing (timing after the operation of the master apparatus or the like) or periodically. Then, on the basis of the result of the inquiry, the group state image 50 may be controlled.

Emphatic Display of Multi-Room-Ready Apparatus

Figure 6:
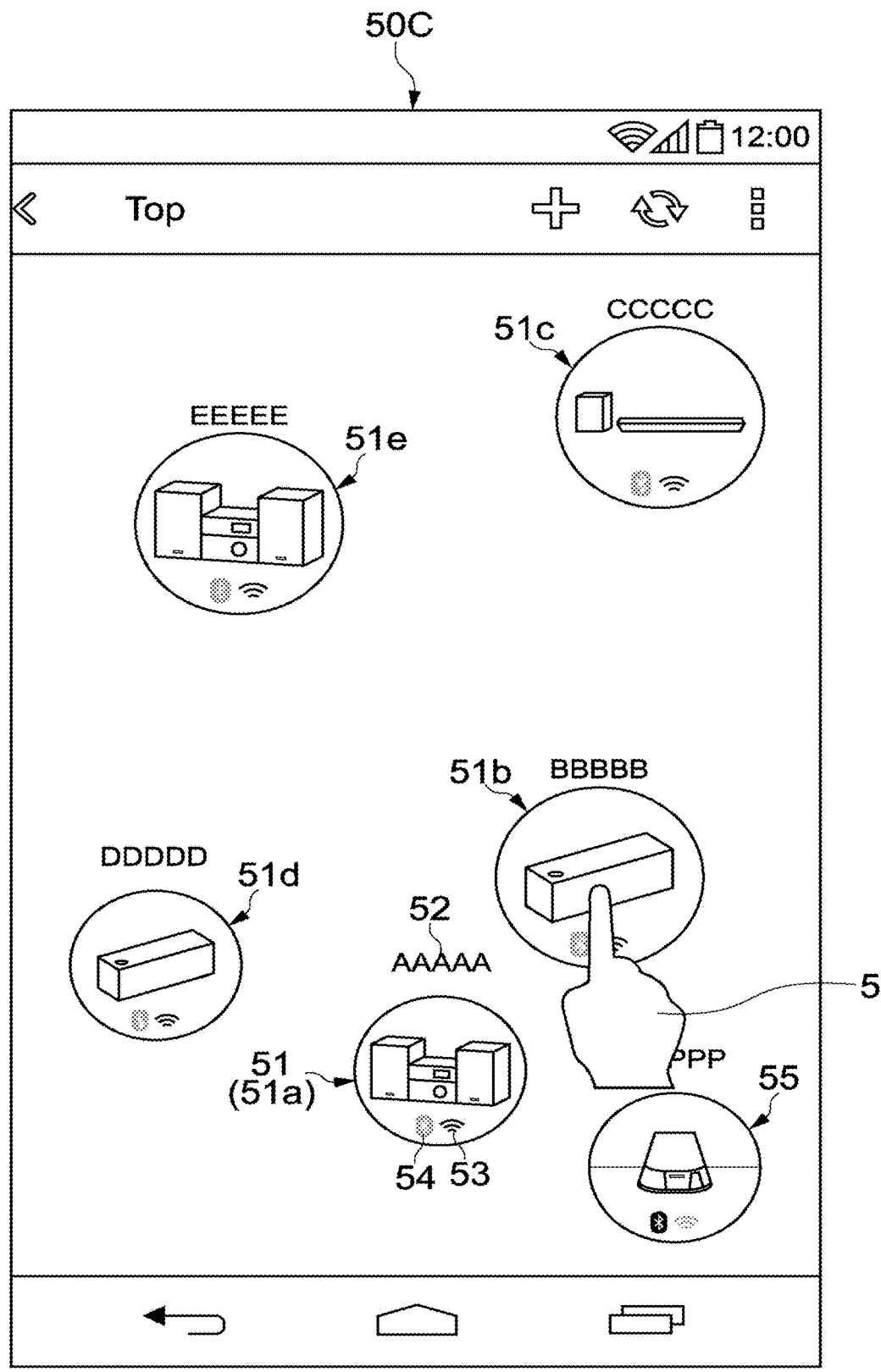
FIG. 6 A diagram showing a configuration example of the group state image in the case where a first operation is input.

FIG. 6 is a diagram showing a configuration example of a group state image 50C in the case where a first operation is input. The first operation is an operation of selecting the icon image 51 of the reproduction apparatus 10 in the group state image 50C by the user 5. The image control unit 41 emphatically displays the icon images 51 of the reproduction apparatuses 10 that are capable of constituting the group (the icon 51b, an icon 51c, and the icon 51e in this example), of the icon images 51 in the group state image 50C, in response to the first operation. Specifically, the multi-room-ready apparatus is emphatically displayed.

The method of emphasizing the icon image 51 is not limited. In this embodiment, while the user 5 selects the icon image 51, animation in which the size of the icon image 51 of the multi-room-ready apparatus is dynamically changed is displayed. Specifically, the icon image 51 of the multi-room-ready apparatus is enlarged or reduced. Alternatively, animation whose color is changed with time or animation in which the icon image blinks may be displayed. Hereinafter, animation is referred to simply as an image in some cases.

By emphatically displaying the icon image 51 of the multi-room-ready apparatus, it is possible to easily know the multi-room-ready apparatus and perform creation of a group and the like with a good operability. Note that in this embodiment, the icon image 51 of the multi-room-ready apparatus is emphatically displayed even in the case where any one of the icon images 51 in the group state image 50C is selected. Instead of this, the emphatic display of the icon image 51 of the multi-room-ready apparatus may be performed only in the case where the icon image 51 of the multi-room-ready apparatus is selected. Further, in the case where the icon image 55 of the non-network apparatus 13 is selected, the indication thereof may be displayed.

New Creation of Group

Figure 7:
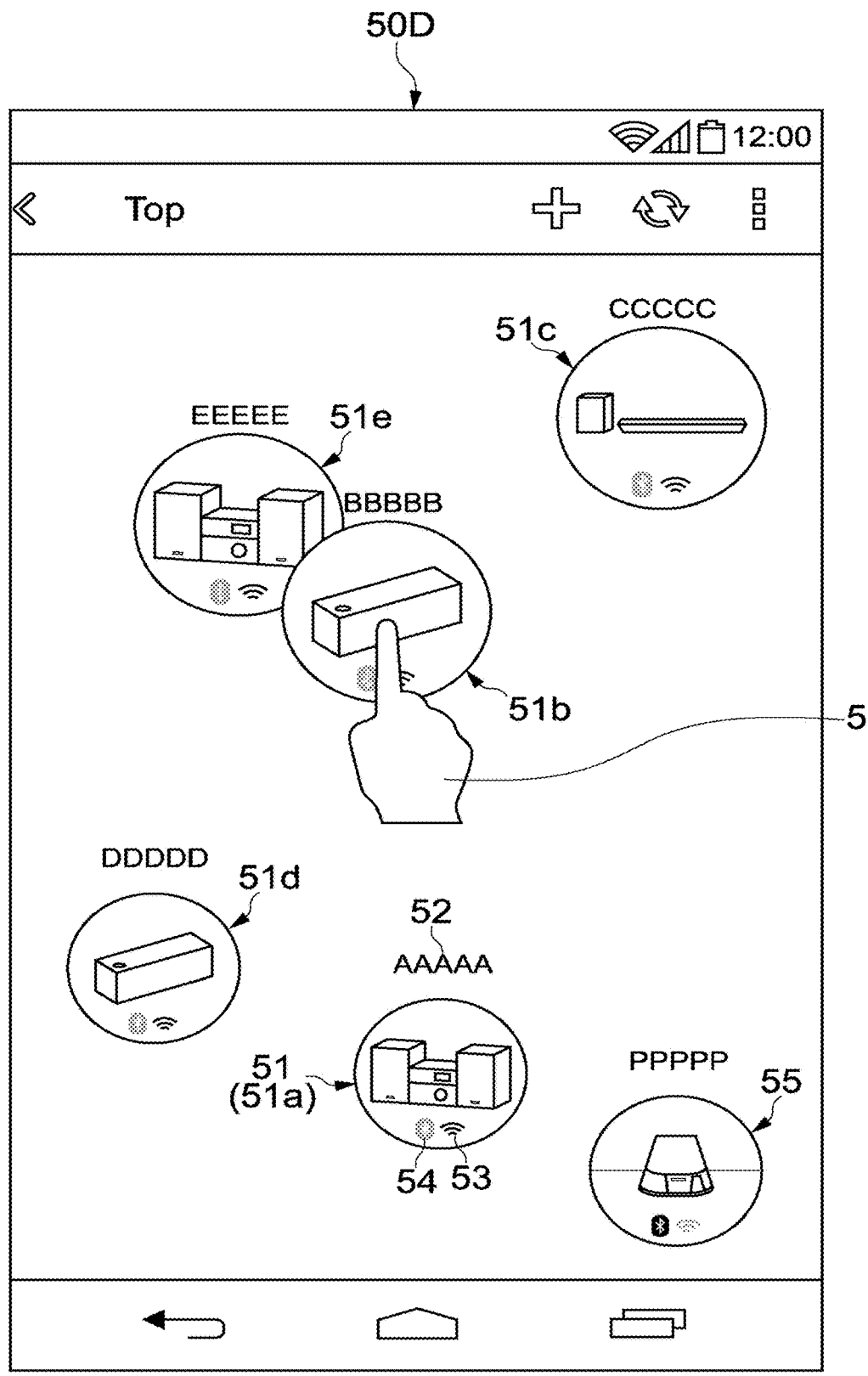
FIG. 7 A diagram showing a configuration example of the group state image in the case where a group is newly created.

FIG. 7 is a diagram showing configuration example of a group state image 50D in the case where new creation of a group is input. When a group is newly created, the user 5 inputs a second operation. The second operation is an operation of moving the icon image 51 (icon image 51b in this example) of the reproduction apparatus 10 that does not constitute a group (hereinafter, referred to as the non-constitution apparatus) and is the multi-room-ready apparatus in the group state image 50 while selecting the icon image 51.

As shown in FIG. 7, in the case where the destination of the second operation is the icon image 51e of the multi-room-ready apparatus and the selection is released on the icon image 51e, the selected non-constitution apparatus and the multi-room-ready apparatus as the destination newly constitute a group, and the group image 56 thereof is displayed. As a result, the image transits from the group state image 50D shown in FIG. 7 to the group state image 50B.

At this time, for example, an image where two images of the icon image 51b and the icon image 51e are apart from each other by a predetermined distance, an image where the circular shape of the group image 56 expands from a dotted shape to a predetermined size, an image where a color is added to the group image 56, and the like are displayed. Accordingly, it is possible to easily recognize that a group is established. As described above, it is possible to easily create a group only by dragging and dropping the icon image 51 of the non-constitution apparatus that is capable of performing the multi-room reproduction on the icon image 51 of another multi-room-ready apparatus.

Note that the image control unit 41 may automatically adjust the position or size of each image so that the icon image 51 and the group image 56 do not overlap each other. For example, in the case where a plurality of group images 56 are displayed, the size of the circular shape of each group image 56 is appropriately reduced and displayed. Accordingly, it is possible to simply display the group constitution image 50.

Figure 8:
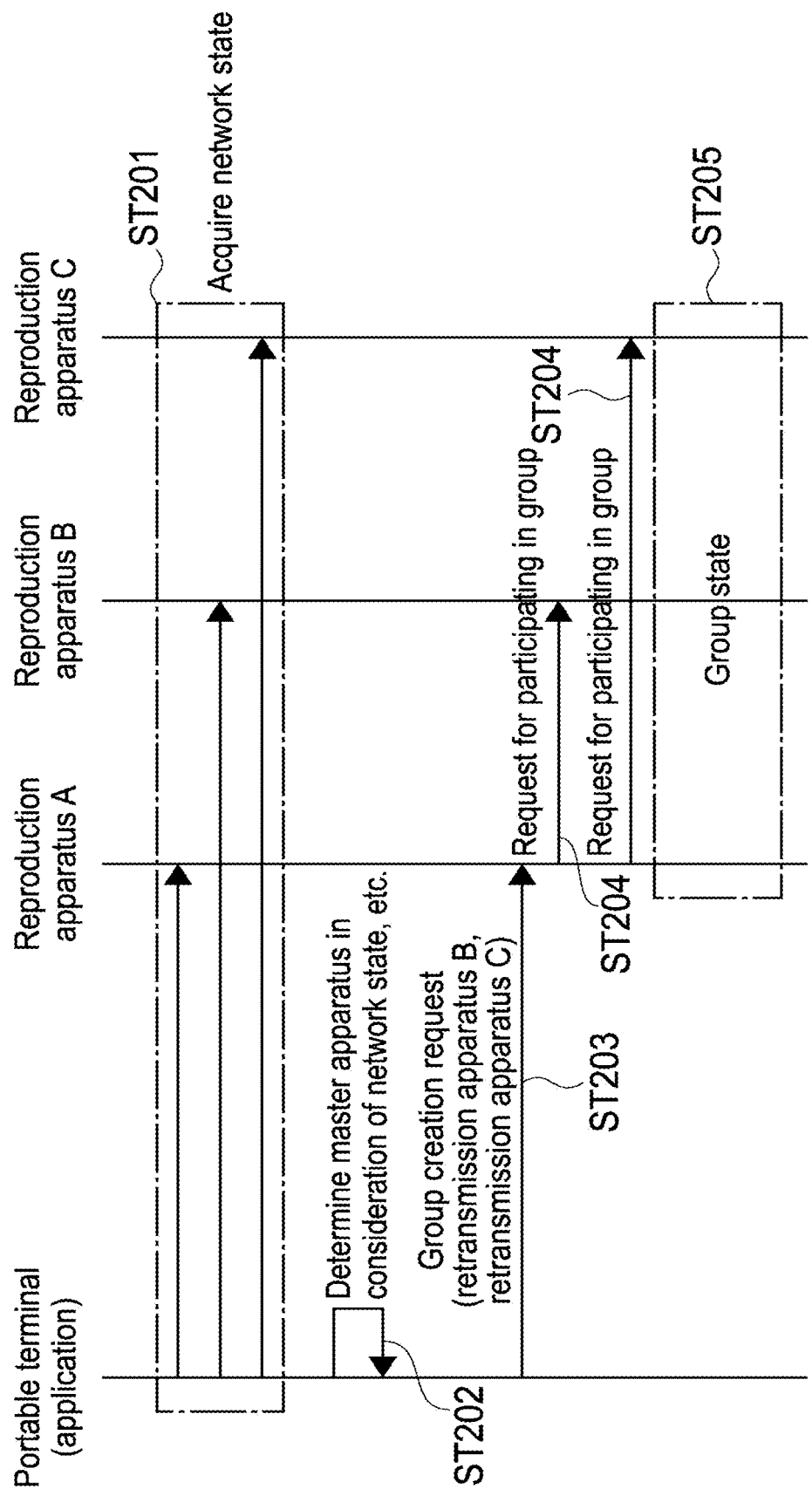
FIG. 8 A sequence diagram showing an example of an operation of newly creating a group.

FIG. 8 is a sequence diagram showing an example of an operation of newly creating a group. The group control unit 42 acquires the network state of the reproduction apparatuses A to C as targets of group constitution (Step 201). The network state is information that represents the connection state with the home network 1, e.g., information on the network strength. This processing may be performed when the operation of newly creating a group shown in FIG. 7 is input or periodically.

On the basis of the acquired information on the network state, any one of multi-room-ready apparatuses is set as the master apparatus (Step 202). For example, the reproduction apparatus 10 having a higher network strength is set as the master apparatus. The method of determining the master apparatus is not limited, and the user may select the master apparatus.

The group control unit 42 transmits a group creation request to the master apparatus (reproduction apparatus A in this example) (Step 203). The request includes an ID of the reproduction apparatus as the slave apparatus (reproduction apparatuses B and C in this example). The master apparatus that receives the creation request transmits a request for participating in the group to the reproduction apparatuses B and C as the slave apparatuses (Step 204). Accordingly, the group is established, and the reproduction apparatuses A to C are in the group state (Step 205).

Note that in the example shown in FIG. 8, there are a plurality of reproduction apparatuses as the slave apparatuses. It goes without saying that in the case where the operation shown in FIG. 7 is input, any one of the reproduction apparatuses 10*b* and 10*e* is set as the master apparatus, and the group participation request is transmitted to the other reproduction apparatus 10. In the case where the touch panel 35 supports the multi-touch operation performed by a plurality of fingers, two non-constitution apparatuses are moved onto another multi-room-ready apparatus in some cases. In this case, as shown in FIG. 8, the participation request is transmitted to the plurality of reproduction apparatuses.

New Addition to Group

Figure 9:
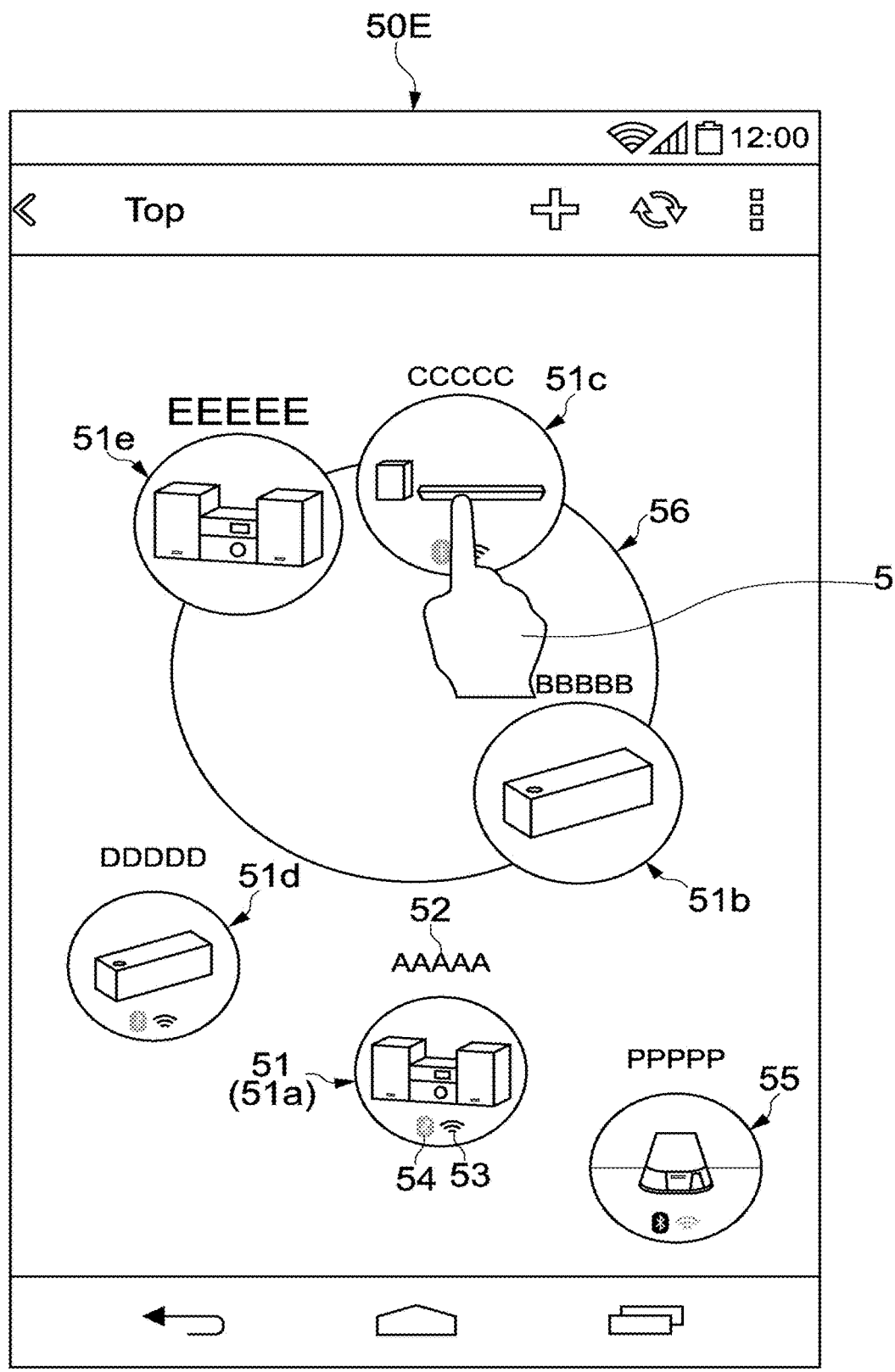
FIG. 9 A diagram showing a configuration example of the group state image in the case where an operation of a new addition to a group is input.
Figure 10:
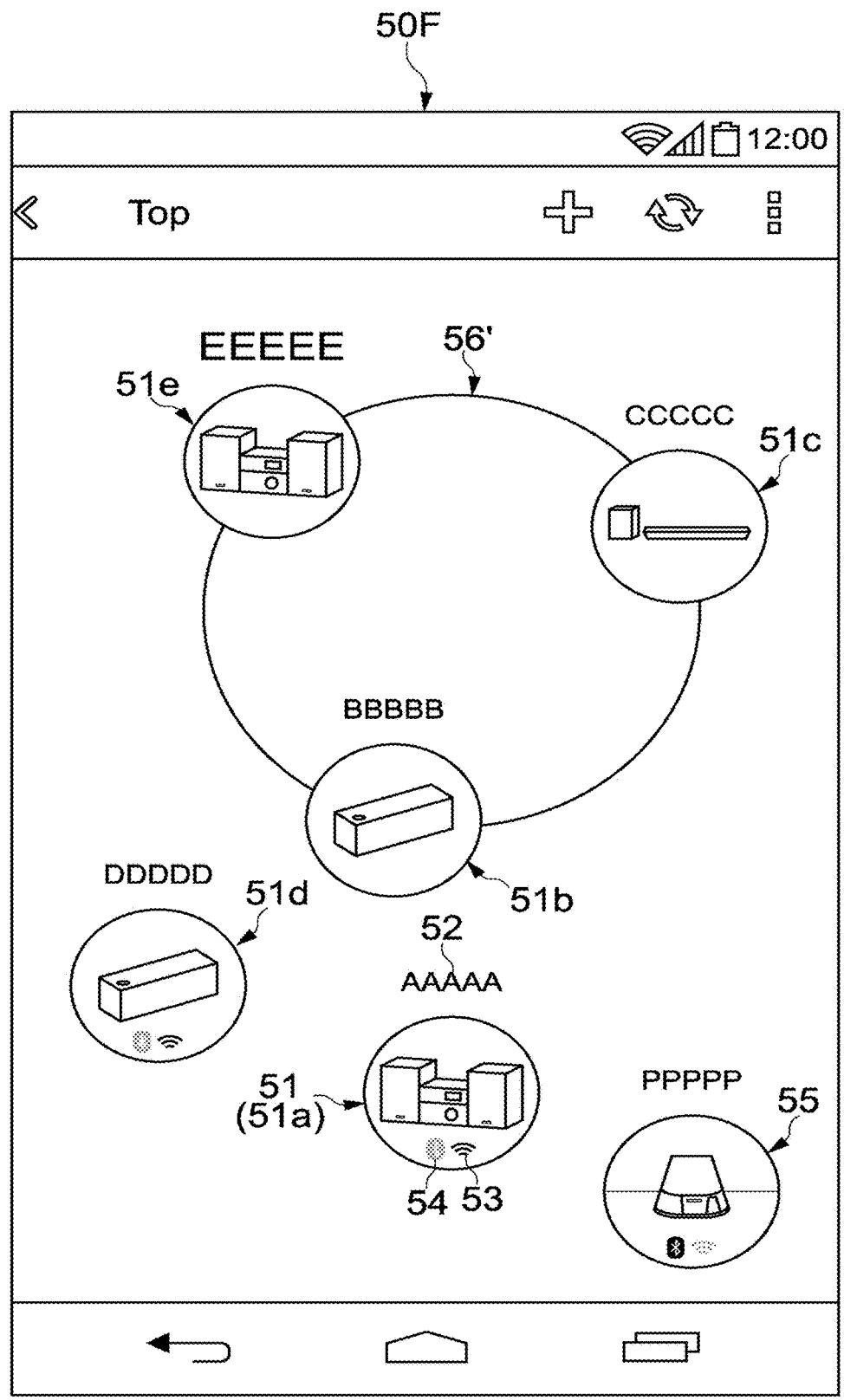
FIG. 10 A diagram showing a configuration example of the group state image in the case where an operation of a new addition to a group is input.

FIG. 9 and FIG. 10 are diagrams showing configuration examples of group state images 50E and 50F, respectively, in the case where an operation of new addition to a group is input. As shown in FIG. 9, in the case where the destination of the second operation is the group image 56 of a group that is already established, the selected non-constitution apparatus and the group apparatus included in the group as the destination newly constitute a group. Then, as shown in FIG. 10, a group image 56' is displayed as the image that represents the group. The icon image 51*c* of the selected non-constitution apparatus and the icon image 51*b* and the icon image 51*e* of the group apparatuses included in the group are placed in the periphery of the group image 56'.

At this time, animation may be appropriately displayed with respect to the position of each icon image 51 and the size or color of the circular shape of the group image 56'. As described above, only by dragging and dropping the multi-room-ready non-constitution apparatus on the group image 56, it is possible to easily make a new addition to the group.

Figure 11:
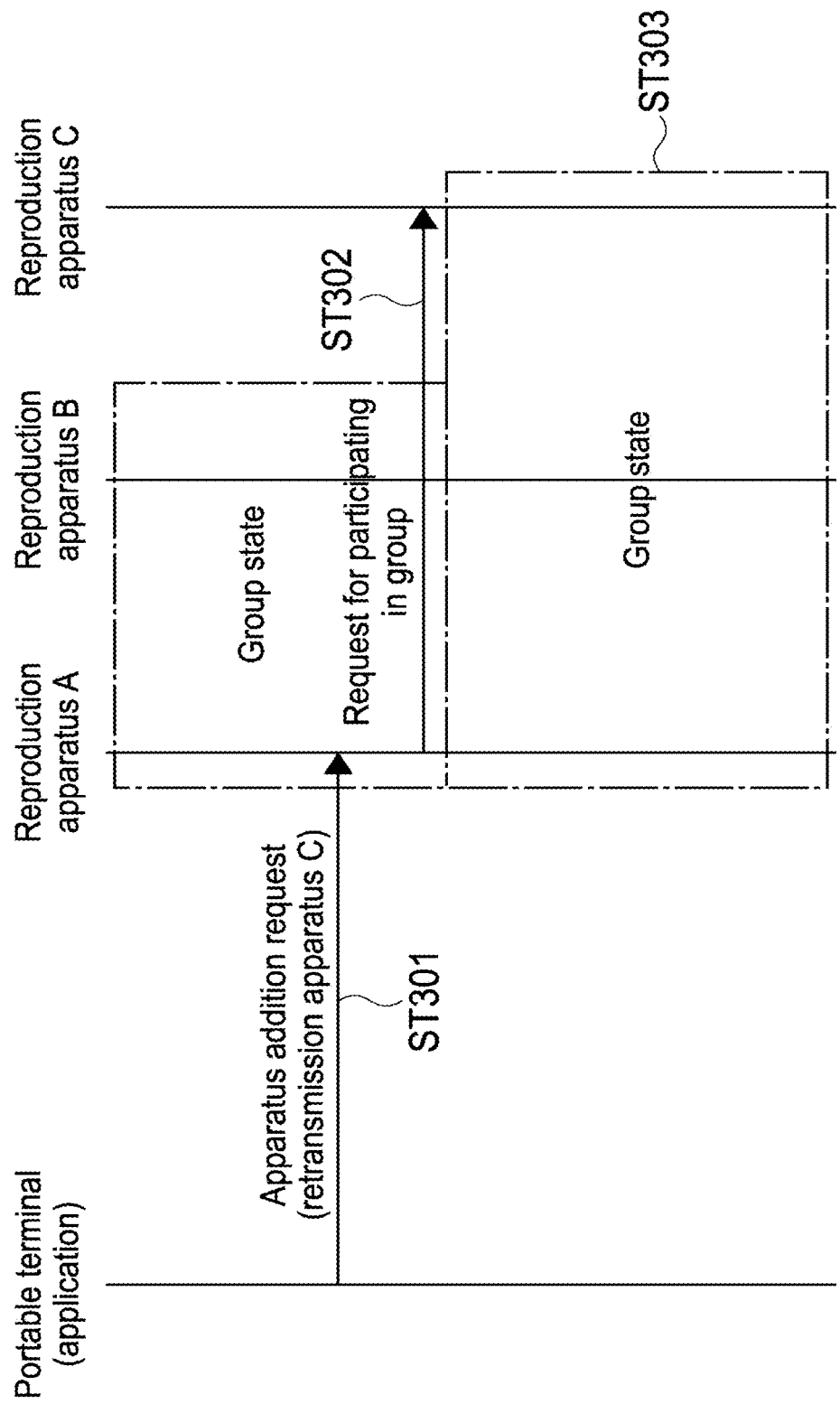
FIG. 11 A sequence diagram showing an example of an operation of a new addition to a group.

FIG. 11 is a sequence diagram showing an example of an operation of a new addition to a group. The group control unit 42 transmits a request for adding a slave apparatus to the master apparatus (reproduction apparatus A in this example) (Step 301). The master apparatus transmits a request for participating in the group to the reproduction apparatus to be added (reproduction apparatus C in this example) on the basis of the ID included in the addition request (Step 302). Accordingly, the reproduction apparatus C is added to the group as the slave apparatus (Step 303).

Movement of Icon Image

In the case where the destination of the second operation is a position where there is no icon image 51 of another reproduction apparatus in the group state image 50, the image control unit 42 causes the selected icon image 51 to move to the position. Accordingly, it is possible to cause the icon image 51 to move with a simple operation, and change the positional relationship between the icon images 51.

For example, it is possible to easily arrange the icon images 51 in the group state image 50 in the arrangement relationship similar to the actual position of the reproduction apparatus 10 placed in each room. Accordingly, the user 5 is capable of instinctively knowing the actual position of the reproduction apparatus 10. In addition, it is also possible to arrange the icon images 51 by classifying them for each type of the reproduction apparatus 10 to improve the operability. It goes without saying that it is not limited thereto.

In the case where the destination of the second operation is on the icon images 51 and 55 of the non-ready apparatus and the non-network apparatus 13, the image control unit 42 returns the selected icon image 51 to the original position. Accordingly, it is possible to easily know that it cannot constitute a group, for example.

Dissolving of Group

Figure 12:
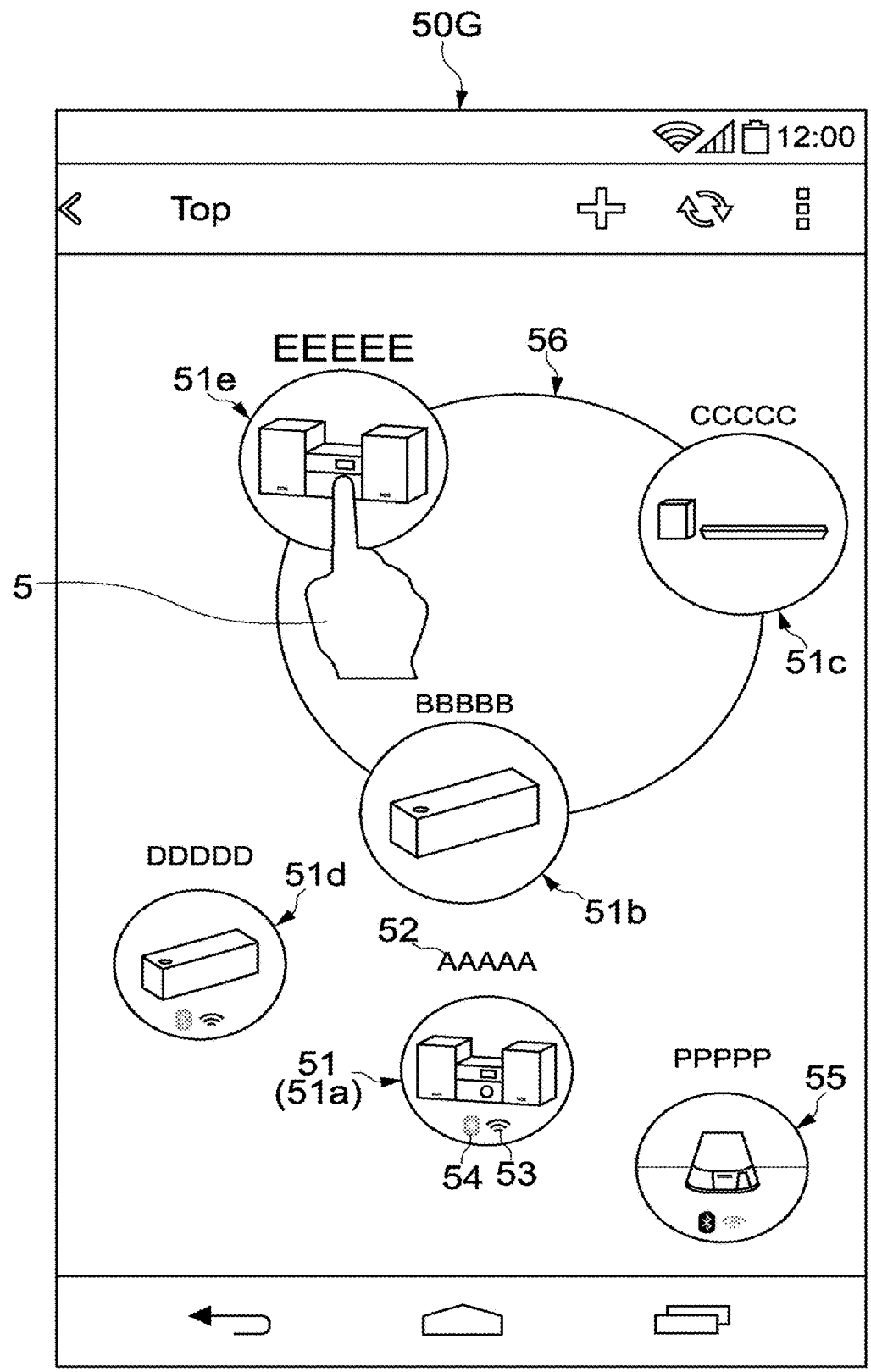
FIG. 12 A diagram showing a configuration example of the group state image in the case where an operation of dissolving a group is input.
Figure 13:
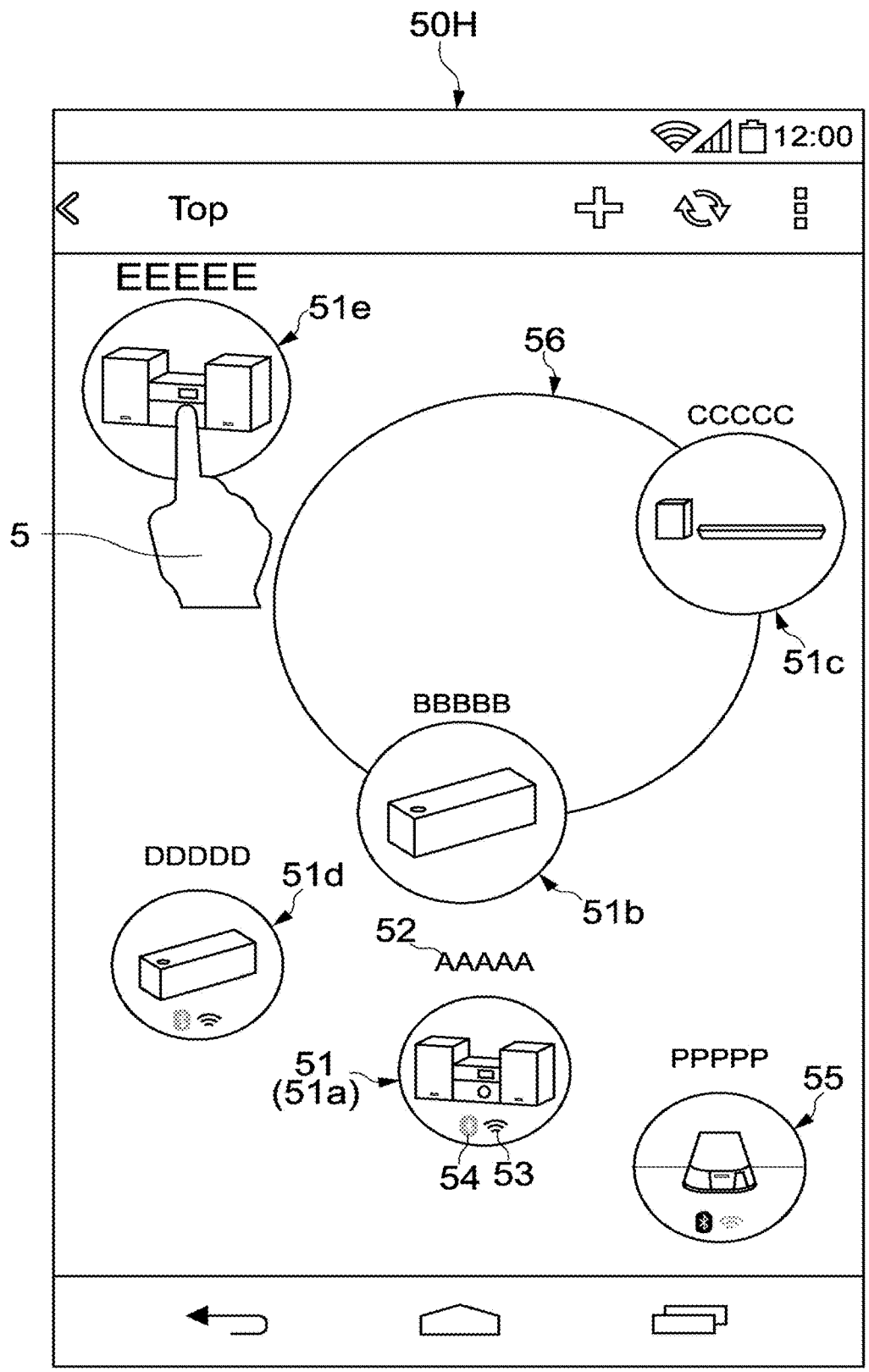
FIG. 13 A diagram showing a configuration example of the group state image in the case where an operation of dissolving a group is input.
Figure 14:
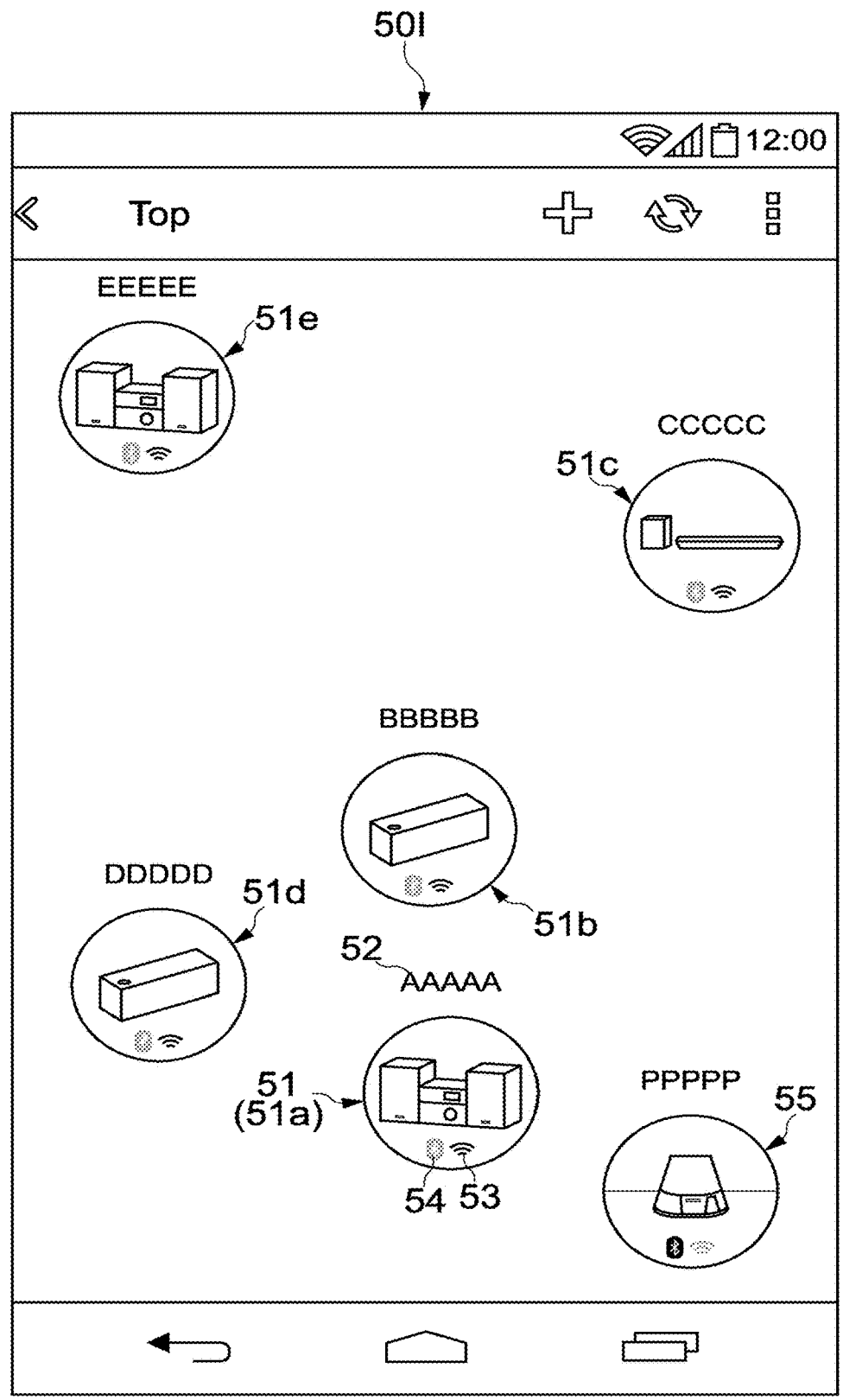
FIG. 14 A diagram showing a configuration example of the group state image in the case where an operation of dissolving a group is input.

FIG. 12 to FIG. 14 are diagrams showing configuration examples of group state images 50G, 50H, and 50I, respectively, in the case where an operation of dissolving a group is input. When a group is dissolved, the user 5 inputs a third operation. The third operation is an operation of moving the icon image 51 of the group apparatus that constitutes a group in the group state image 50 while selecting the icon image 51.

As shown in FIG. 12 and FIG. 13, assumption is made that the icon image 51*e* of the master apparatus is selected, and moved to a position that is away from the group image 56 of the group including the master apparatus. As a result, the group is dissolved, and the group image 56 is deleted as shown in FIG. 14. Further, the icon image 51*e* of the reproduction apparatus that has been the master apparatus is moved to the position where the selection is released.

As described above, only by dragging and dropping the icon image 51 of the master apparatus on a position that is away from the group image 56, it is possible to simply dissolve the group. Note that as the image where the group is dissolved, an arbitrary image may be displayed as long as the indication of the dissolving can be understood. Further, the indication that the group is dissolved may be displayed by a text image or the like.

The position that is away from the group image 56 is typically a position outside of the group image 56. However, it is not limited thereto, and the inside or the like of the group image 56 can be the position that is away from the group image 56, depending on the shape or the like of the group image 56. Further, in the case where a predetermined area in the group state image 50 is defined as a group withdrawal area or dissolving area, the inside of the area is the position that is away from the group image 56.

Figure 15:
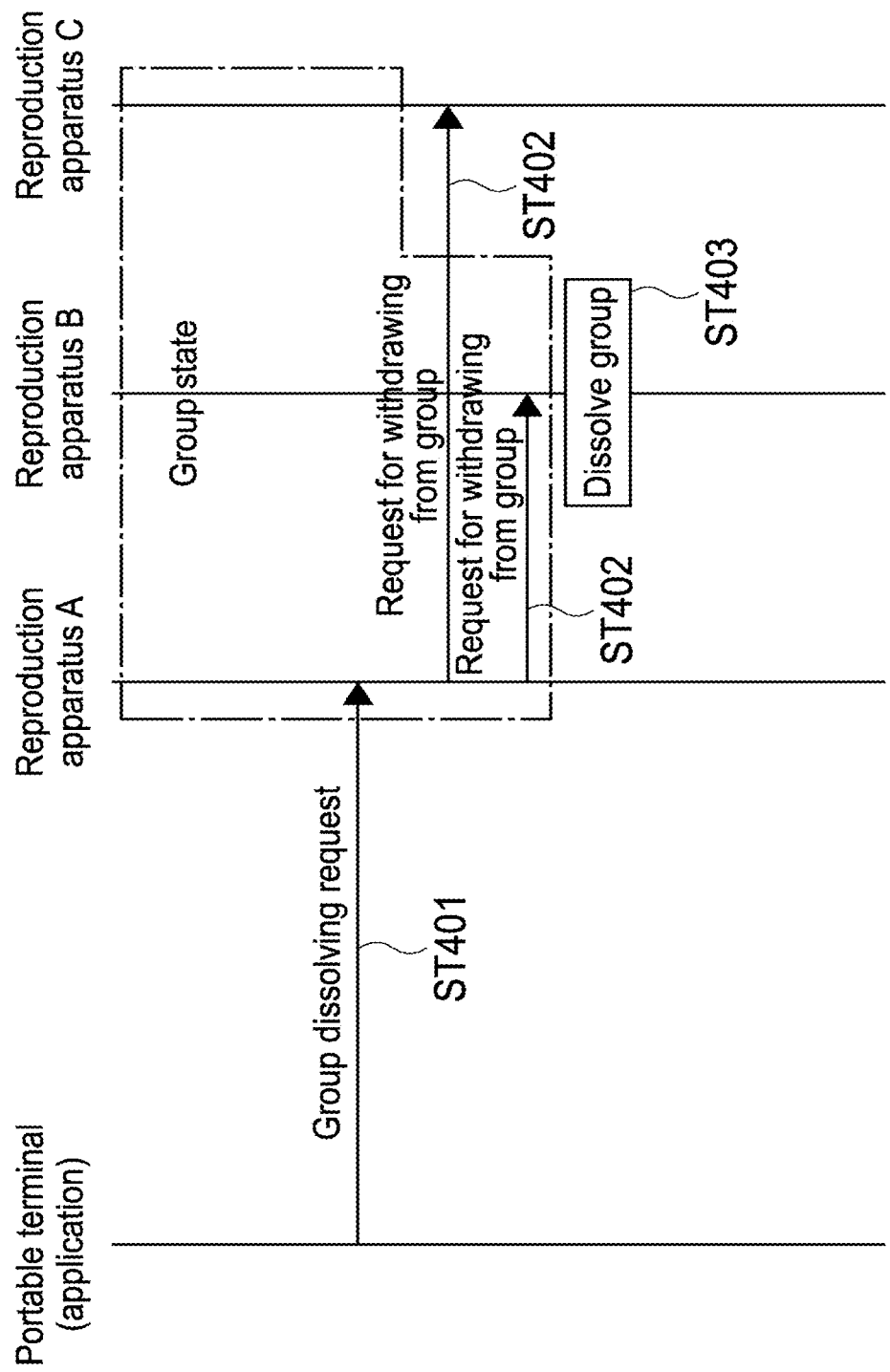
FIG. 15 A sequence diagram showing an example of an operation of dissolving a group.

FIG. 15 is a sequence diagram showing an example of an operation of dissolving a group. The group control unit 42 transmits a request for dissolving a group to the master apparatus (reproduction apparatus A in this example) (Step 401). The master apparatus that receives the dissolving request transmits a request for withdrawing from a group to all the slave apparatuses that belong to the group (reproduction apparatuses B and C in this example) (step 402). When all the slave apparatuses are withdrawn, the group is dissolved (Step 403). Note that the dissolving of the group may be performed by another method.

Withdrawal from Group

Assumption is made that the icon images 51b and 51c of the slave apparatuses of the group apparatuses are selected, and moved to a position that is away from the group image 56 of the group including the slave apparatuses. In this case, the withdrawal of the selected slave apparatuses from the group is performed, and the image thereof is displayed (e.g., transition from the group state image 50E in FIG. 9 to the group state image 50B in FIG. 5). As described above, it is possible to easily withdraw the icon image 51 of the slave apparatus from the group only by dragging and dropping the icon image 51 on the position that is away from the group image 56.

Figure 16:
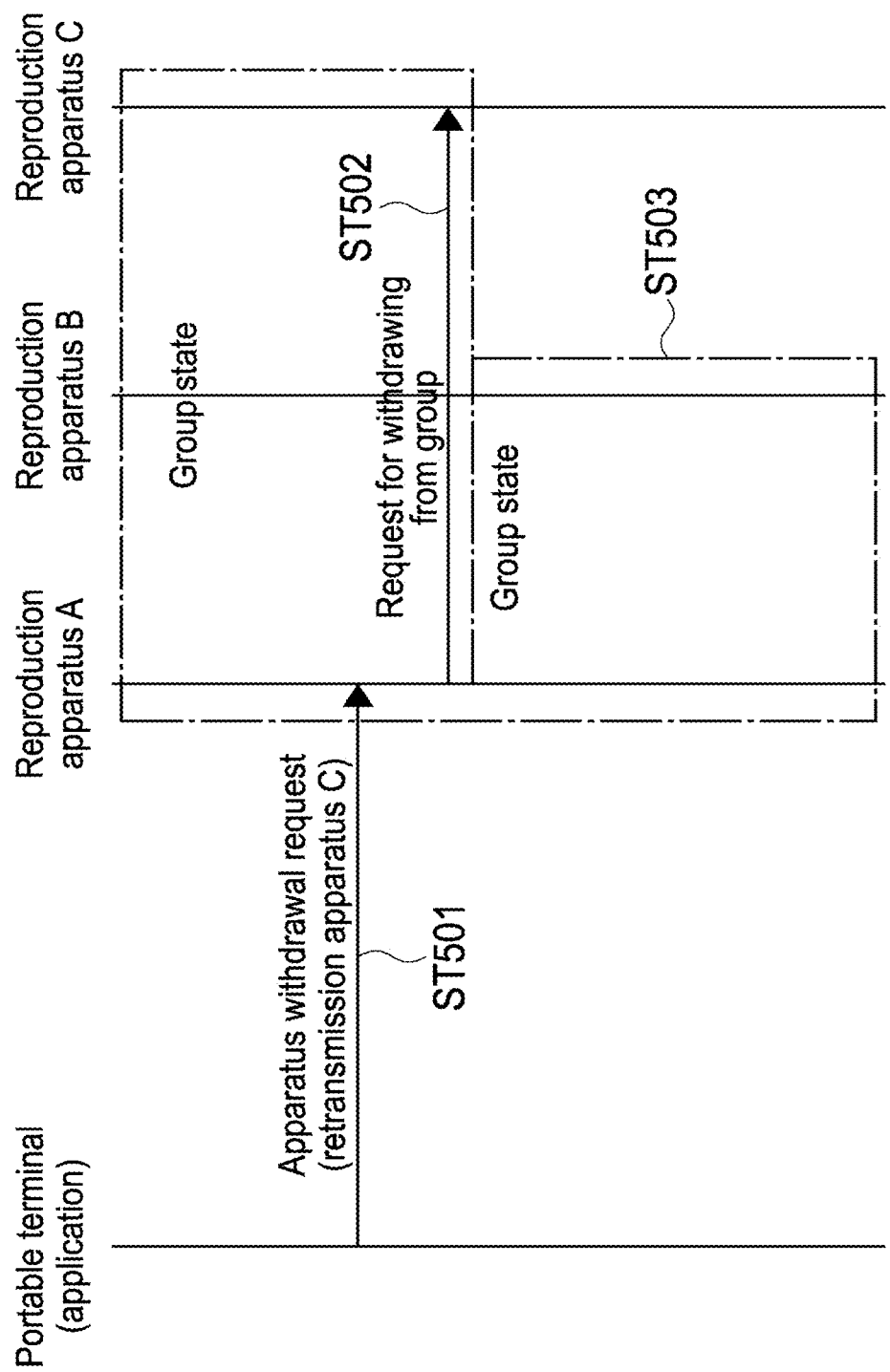
FIG. 16 A sequence diagram showing an example of an operation of withdrawing from a group.

FIG. 16 is a sequence diagram showing an example of an operation of withdrawing from a group. The group control unit 42 transmits a request for withdrawal of the slave apparatus to the master apparatus (reproduction apparatus A in this example) (Step 501). The master apparatus transmits the withdrawal request to the reproduction apparatus to be withdrawn (reproduction apparatus C in this example) on the basis of the ID included in the withdrawal request (Step 502). Accordingly, the reproduction apparatus C is withdrawn from the group, and the group constitution including the remaining reproduction apparatuses is left (Step 503).

Note that in the present disclosure, the withdrawal represents getting out of the state where it constitutes a group, i.e., the state where the belonging to the group is eliminated. When the group is dissolved, the belonging to the group is inevitably eliminated. Therefore, in the present disclosure, the image where the group is dissolved is included in the image where the group apparatus is withdrawn from the group (image where the belonging to the group is eliminated).

As described above, in the portable terminal 30 according to this embodiment, whether or not each of the plurality of reproduction apparatuses 10 connected to the home network 1 constitutes a group is detected. The group state image 50 including the icon image 51 of each reproduction apparatus 10 is output on the basis of the detection result, and the group state image 50 is controlled in response to the operation performed by the user 5. Accordingly, the user 5 is capable of inputting various operations such as new creation of a group and new addition to a group while watching the group state image 50 on one screen. As a result, it is possible to control reproduction of content with a good operability.

The operation that can be input to the group state image 50 is not limited to those described above. For example, the icon images 51 and 55 of the non-ready apparatus that does not support the multi-room reproduction and the non-network apparatus 13 can be selected and moved to a position where there is no icon image 51 of another reproduction apparatus 10. In the case where the destination is on another reproduction apparatus 10, the icon images 51 and 55 are returned to the respective original positions.

In the case where the icon image 51 of the group apparatus is dragged and dropped on the icon image 51 of another group-ready apparatus located at a position that is away from the group image 56, a new group including the group apparatus and the group-ready apparatus as the destination may be established, and the group image 56 thereof may be displayed. Further, in the case where the destination of the icon image 51 of the group apparatus is another group image 56, the group image 56 in which the group apparatus is added to the group may be displayed. In the case where the destination is on the icon images 51 and 55 of the non-ready apparatus and the non-network apparatus 13, the icon image 51 is returned to the periphery of the group image 56 (not withdrawn from the group).

Further, in the case where the icon image 51 of the master apparatus is moved to a position that is away from the group image 56, the group does not necessarily need to be dissolved, the group may continue with any one of the remaining slave apparatuses as the master apparatus, and the group image 56 thereof may be displayed. In addition, various operations can be input.

Other Embodiments

The present technology is not limited to the embodiment described above, and other various embodiments can be achieved.

Figure 17:
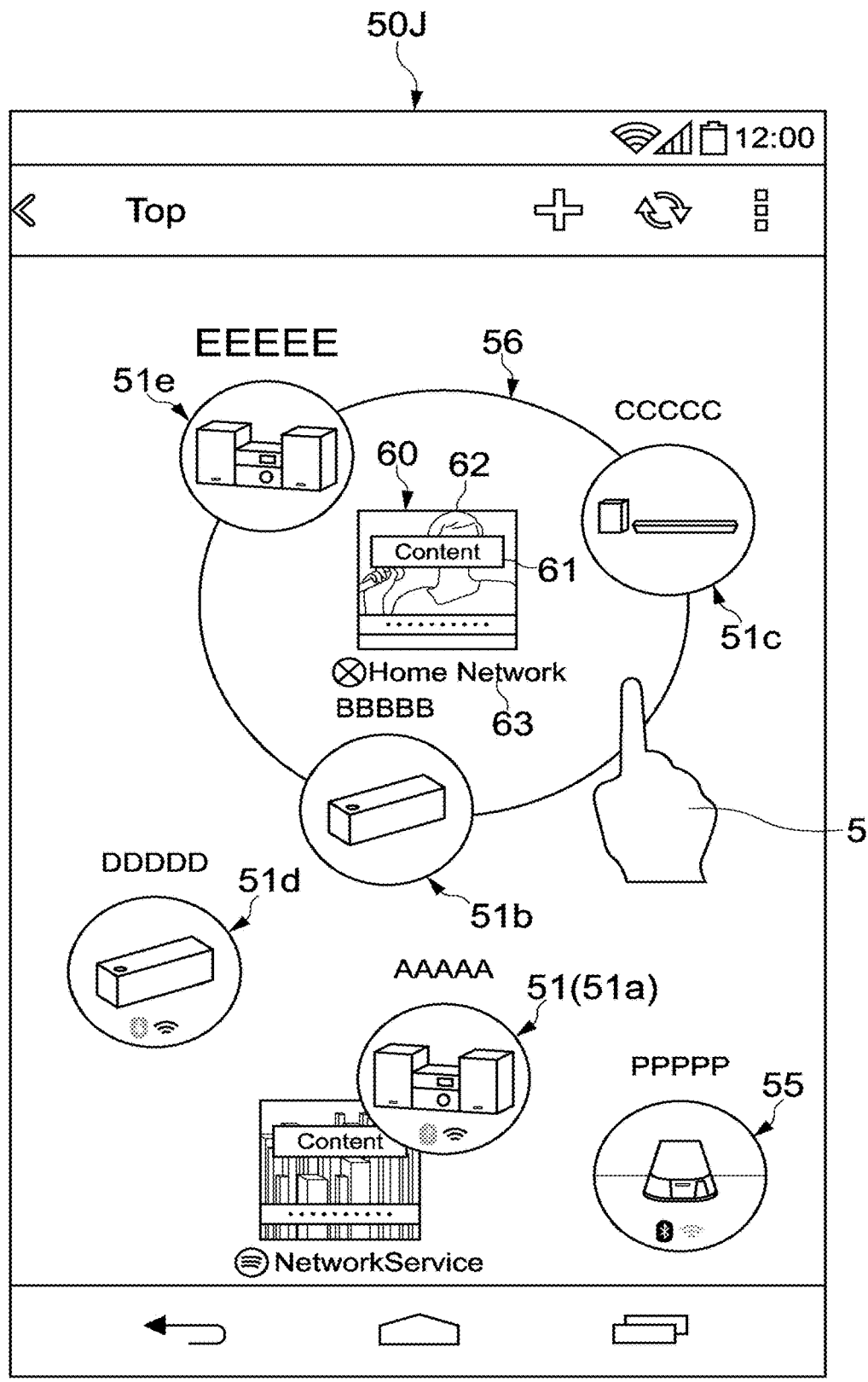
FIG. 17 A diagram showing a configuration example of the group state image on which meta-information related to content is displayed.

FIG. 17 is a diagram showing a configuration example of a group state image 50J in which meta-information related to content is displayed. For example, meta-information 60 related to content reproduced by a plurality of group apparatuses included in the same group may be displayed in the group state image 50J. In the example shown in FIG. 17, a content name 61 and an artist image 62 are displayed as the meta-information. However, it is not limited thereto.

For example, in the above-mentioned embodiment, content supplied from the server apparatus 20 on the home network 1 is described as an example of content on which the multi-room reproduction is performed. However, it is not limited thereto, and content read by the group-ready apparatus via a CD or USB or content acquired by the group-ready apparatus from predetermined service such as the Internet may be reproduced. In such a case, as the meta-information 60, information 63 that represents the acquisition destination of content (location of content) may be displayed.

Note that the meta-information may be displayed also in the case where normal reproduction that is not the multi-room reproduction is performed. In FIG. 17, the content name 61, the artist image 62, and the acquisition destination (network service on the Internet) information 63 of content reproduced by a non-ready apparatus 10a corresponding to an icon image 51a are displayed.

In addition, as the meta-information related to content, Internet information related to content may be displayed. The Internet information is the URL (Uniform Resource Locator) of a website related to content, the link to an SNS (Social Networking Service) related to content, or the like. Further, advertisement related to content, TV program information, and the like may be displayed. By display the meta-information, it is possible to acquire detailed information related to content and enjoy the reproduction of content more.

Further, as shown in FIG. 17, the image control unit 41 may output a reproduction information image when a fourth operation in which the user 5 selects the group image 56 in the group state image 50J is input. The reproduction information image is an image including reproduction information related to the multi-room reproduction performed by a plurality of group apparatuses. Specifically, the output of the reproduction information image in addition to the control of the group state image may be performed.

Figure 18:
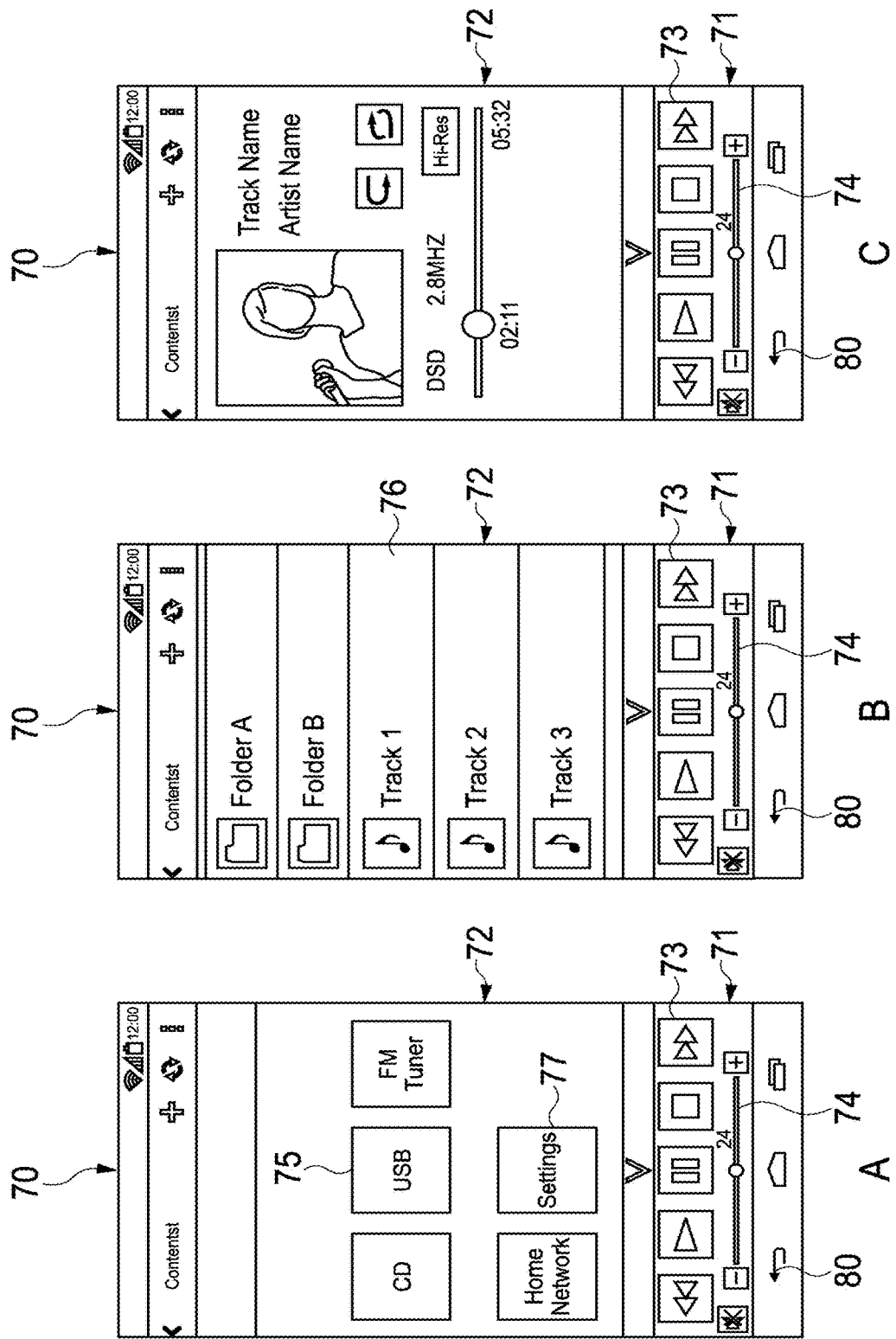
FIG. 18 A diagram showing an example of a reproduction information image.
Figure 19:
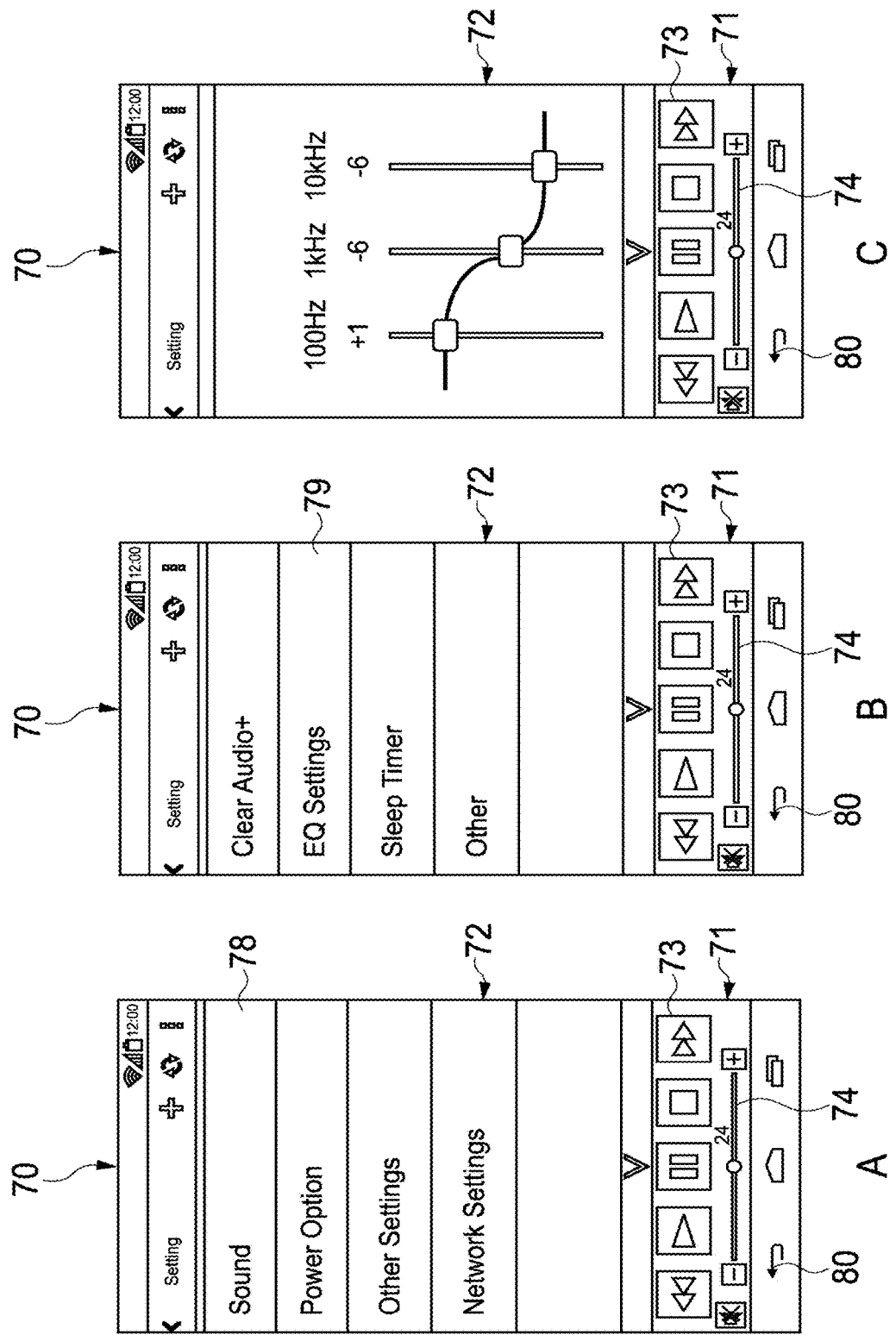
FIG. 19 A diagram showing an example of a reproduction information image.

FIG. 18 and FIG. 19 are each a diagram showing an example of the reproduction information image. A reproduction information image 70 shown in FIG. 18 and FIG. 19 includes a reproduction control unit 71 and an information display unit 72. The reproduction control unit 71 includes a plurality of control buttons 73 for controlling reproduction of content and a volume adjustment bar 74. By operating the reproduction control unit 71, it is possible to easily control the multi-room reproduction performed by a plurality of group apparatuses.

On the information display unit 72, reproduction information related to reproduction of content is displayed. On the information display unit 72 in part A of FIG. 18, the kind of content on which multi-reproduction can be performed by the selected group is displayed. For example, an icon image 75 that represents a home network, CD, or the like is displayed. Accordingly, it is possible to easily know content that can be reproduced for each group.

On the information display unit 72 in part B of FIG. 18, information on a file in which content on which the multi-room reproduction can be performed is stored or information on content is displayed in a list. On the information display unit 72 in part C of FIG. 18, information on content on which the multi-room reproduction is being performed is displayed. For example, a content name, an artist image, a reproduction position, and the like are displayed.

On the information display unit 72 in part A of FIG. 19, pieces of information on items for performing various kinds of setting are displayed in a list. The various kinds of setting include reproduction setting, power source setting, other setting, network setting, and the like. The information display unit 72 in part B of FIG. 19 includes pieces of information on items for performing various kinds of setting related to reproduction of content. Examples of the pieces of information on items include sound quality setting, EQ (equalizer) setting, timer setting, and other setting. On the information display unit 72 in part C of FIG. 19, an equalizer for EQ setting is displayed.

The reproduction information images 70 shown in FIG. 18 and FIG. 19 may be switchably displayed. For example, the reproduction information image 70 may be switchable in the order of part A of FIG. 18, part B of FIG. 18, and then part C of FIG. 18. At this time, the following operation is input, for example.

Any one of the icon images 75 of the content type in part A of FIG. 18 is selected, any one of content items 76 in part B of FIG. 18 is selected, and then, content information in part C of FIG. 18 is displayed.

Further, the reproduction information image 70 may be switchable in the order of part A of FIG. 18, part A of FIG. 19, part B of FIG. 19, and then, part C of FIG. 19, for example. At this time, the following operation is input, for example.

An icon image 77 for setting in part A of FIG. 18 is selected, a sound item 78 in part A of FIG. 19 is selected, an item 79 for EQ setting in part B of FIG. 19 is selected, and then, an equalizer in part C of FIG. 19 is displayed. Note that by selecting a return button 80, it is possible to perform switching in the opposite direction.

By displaying the reproduction information image as describe above, it is possible to perform reproduction setting for each group, EQ setting, and the like with a simple operation. Specifically, it is possible to collectively perform reproduction setting or the like of a plurality of group apparatuses, and exert a high operability. It goes without saying that an image including information different from that described above may be displayed as the reproduction information image.

By selecting the icon image 51 of the reproduction apparatus 10 that performs normal reproduction that is not the multi-room reproduction, the reproduction information image 70 related to the normal reproduction may be output. It can be said that the reproduction information image is a function image related to the multi-room reproduction or the normal reproduction.

The above-mentioned group in which the multi-room reproduction is performed is an example of the group related to reproduction of content according to the present technology. Specifically, it is not limited to the multi-room reproduction, and the present technology can be applied to a group in which another reproduction operation or the like can be performed or a group established under another reproduction condition.

In the above, description has been made with the home network 1 established in a house as an example. It goes without saying that it is not limited thereto, and the present technology can be applied to a local network established in a company, facility, or the like. Further, a local network may be established in buildings apart from each other. For example, a car audio provided in a vehicle is employed as the reproduction apparatus, and the present technology may be applied to the local network to which the car audio is connected. Further, the present technology may be applied on the global network.

The number of reproduction apparatuses constituting a group is not limited, but the upper limit thereof, e.g., not more than 10, may be set. It goes without saying that the upper limit does not necessarily need to be set.

In the above, a portable terminal has been illustrated as the information processing apparatus according to the present technology. However, it is not limited thereto, and the present technology can be executed by an arbitrary computer such as a stationary apparatus. For example, the group state image 50 and the like may be displayed on the touch panel of the reproduction apparatus 10 that is capable of operating as a DMP, and various operations may be input thereto.

At least two features of the above-mentioned features according to the present technology may be combined. Specifically, various features described in each embodiment may be arbitrarily combined without distinguishing the embodiments with each other. Further, the various effects described above are merely examples and are not limited, and additional effects may be exerted.

It should be noted that the present technology may also take the following configurations.

(1) An information processing apparatus, including:
a detection unit that is capable of detecting whether or not each of a plurality of reproduction apparatuses constitutes a group related to reproduction of content, each of the plurality of reproduction apparatuses being connected to a network, each of the plurality of reproduction apparatuses being capable of reproducing the content;
an acceptance unit that accepts a user operation related to constitution of the group; and
an image control unit that outputs a group state image on the basis of a detection result by the detection unit, the group state image representing a constitution state of the group, the group state image including an image of each of the plurality of reproduction apparatuses, and controls the group state image in response to the accepted user operation related to constitution of the group.
(2) The information processing apparatus according to (1), in which
the image control unit displays, when a reproduction apparatus constituting the group is detected, an image of the group including the reproduction apparatus in the group state image.
(3) The information processing apparatus according to (1) or (2), in which
the group is a group that is capable of reproducing the same content at the same time.
(4) The information processing apparatus according to any one of (1) to (3), in which
the acceptance unit accepts a first operation of selecting an image of one of the plurality of reproduction apparatuses, and
the image control unit emphatically displays an image of a reproduction apparatus that is capable of constituting the group, in response to the first operation.
(5) The information processing apparatus according to (4), in which
the acceptance unit accepts a second operation of causing an image of a non-constitution apparatus that is capable of constituting the group to move in the group state image while selecting the image of the non-constitution apparatus, the non-constitution apparatus being a reproduction apparatus that does not constitute the group, and
the image control unit displays, when a destination of the second operation is an image of the reproduction apparatus that is capable of constituting the group, an image of a group that is newly constituted of the selected non-constitution apparatus and the reproduction apparatus as the destination.
(6) The information processing apparatus according to (4) or (5), in which
the acceptance unit accepts a second operation of causing an image of a non-constitution apparatus that is capable of constituting the group to move in the group state image while selecting the image of the non-constitution apparatus, the non-constitution apparatus being a reproduction apparatus that does not constitute the group, and
the image control unit displays, when a destination of the second operation is an image of a group that is already established, an image of a group that is newly constituted of the selected non-constitution apparatus and the reproduction apparatus included in the group as the destination.
(7) The information processing apparatus according to any one of (4) to (6), in which
the acceptance unit accepts a second operation of causing an image of a non-constitution apparatus that is capable of constituting the group to move in the group state image while selecting the image of the non-constitution apparatus, the non-constitution apparatus being a reproduction apparatus that does not constitute the group, and
the image control unit causes, when a destination of the second operation is a position where there is no image of another reproduction apparatus, an image of the selected non-constitution apparatus to move to the position.
(8) The information processing apparatus according to any one of (4) to (7), in which
the acceptance unit accepts a second operation, an image of a non-constitution apparatus that is capable of constituting the group being selected and moved in the group state image in the second operation, the non-constitution apparatus being a reproduction apparatus that does not constitute the group, and
the image control unit returns, when a destination of the second operation is an image of a reproduction apparatus that is not capable of constituting the group, an image of the selected non-constitution apparatus to its original position.
(9) The information processing apparatus according to any one of (5) to (8), in which
the acceptance unit accepts a third operation of causing an image of a group apparatus to move in the group state image while selecting the image of the group apparatus, the group apparatus being a reproduction apparatus that constitutes the group, and
the image control unit displays, when a destination of the third operation is a position that is away from an image of the group including the selected group apparatus, an image where the group apparatus is withdrawn from the group.
(10) The information processing apparatus according to (9), in which
the image control unit identifiably displays one of a plurality of group apparatuses included in the group as a master apparatus, and displays, when an image of the master apparatus is selected and moved to the position that is away from the image of the group by the third operation, an image where the group is dissolved.
(11) The information processing apparatus according to (9) or (10), in which
the acceptance unit accepts a fourth operation of selecting an image of the group, and
the image control unit outputs a reproduction information image including information related to reproduction of the content by a plurality of group apparatuses included in the group, in response to the fourth operation.
(12) The information processing apparatus according to (11), in which
the reproduction information image includes information on content that the plurality of group apparatuses are capable of reproducing at the same time.
(13) The information processing apparatus according to any one of (1) to (12), in which
the image control unit displays meta-information related to content that is being reproduced by the plurality of group apparatuses in the group state image.
(14) The information processing apparatus according to any one of (1) to (13), in which
the acceptance unit is a touch panel, and
the group state image is displayed on the touch panel.

REFERENCE SIGNS LIST 1 home network
10 reproduction apparatus
13 non-network apparatus
20 server apparatus
30 portable terminal
40 detection unit
41 image control unit
42 group control unit
50 group state image
51 icon image
56 group image
60 meta-information
70 reproduction information image
500 network system

The invention claimed is:

1. An information processing apparatus, comprising: circuitry including a processor and a memory, the circuitry configured to: detect a plurality of first reproduction circuits being associated together to constitute a group, each reproduction circuit being connected to a network, display, based on the detection, at least a group state image including (i) a set of first icon images representing the plurality of first reproduction circuits along with at least (ii) a second image icon image connecting each of the first icon images along the periphery of the second icon indicating that the plurality of first reproduction circuits constitute the group, (iii) a third icon image representing an instruction to detect an non-network circuit upon selecting the third icon image and display the detected non-network circuit, and (iv) a fourth icon image outside of the second icon image representing a second reproduction circuit along with a first sub-icon image indicating whether or not the second reproduction circuit is connected to the network and a second sub-icon image indicating whether or not the second reproduction circuit is connected over a near-field communication,
    accept a first user operation from a user, the first user operation including selection of one icon of the set of first icon images of the group,
    determine meta-information of content being commonly reproduced by the plurality of first reproduction circuits, and
    display the meta-information in the group state image at a vertical and horizontal center of the second image icon and outside of the set of first icon images in response to the first user operation.

2. The information processing apparatus according to claim 1, wherein the group is capable of reproducing the same content at the same time.

3. The information processing apparatus according to claim 1, wherein the circuitry is further configured to display the selected one icon of the set of first icon images with an emphasis in response to the first user operation.

4. The information processing apparatus according to claim 3, wherein the circuitry is further configured to accept a second operation of causing a fifth icon image of a third reproduction circuit, which is not a part of the group, to move in another group state image and newly constitute another group.

5. The information processing apparatus according to claim 4, wherein the circuitry is further configured to accept a second operation of causing a fifth icon image of a third reproduction circuit, which is a part of the group, to appear in the group state image that is already established and move the fifth icon image to a position that is away from the group state image so that the third reproduction circuit is withdrawn from the group.

6. The information processing apparatus according to claim 5, wherein the circuitry is further configured to identifiably display one of the set of first icon images of the group as a master circuit and display an image of the group being dissolved when the one of the set of first icon images identifiably displayed as the master circuit is selected and moved out of the group state image.

7. The information processing apparatus according to claim 5, wherein the circuitry is further configured to output a reproduction information image including information related to a reproduction of content by the plurality of first reproduction circuits of the group, in response to the first user operation.

8. The information processing apparatus according to claim 7, wherein the reproduction information image includes information on the content that the plurality of first reproduction circuits of the group are capable of reproducing at the same time.

9. The information processing apparatus according to claim 3, wherein the circuitry is further configured to accept a second operation of causing a fifth icon image of a third reproduction circuit, which is not a part of the group, to move in the group state image that is already established.

10. The information processing apparatus according to claim 3, wherein the circuitry is further configured to accept a second operation of causing a fifth icon image of a third reproduction circuit, which is not a part of the group, to move in the group state image that is already established and further move to a position where there is no image of another reproduction apparatus.

11. The information processing apparatus according to claim 3, wherein the circuitry is further configured to accept a second operation of causing a fifth icon image of a third reproduction circuit, which is not a part of the group, to move in the group state image that is already established and return the fifth icon image back to its original position when the third reproduction circuit is not capable of constituting the group.

12. The information processing apparatus according to claim 1, wherein the circuitry is further configured to display the group state image on a touch panel.

13. The information processing apparatus according to claim 1, wherein one of the set of first icon images is emphatically displayed so as to indicate that the one represents a master apparatus among a group of apparatuses represented by the set of first icon images.

14. An information processing method, comprising: detecting a plurality of first reproduction circuits being associated together to constitute a group, each reproduction circuit being connected to a network; displaying, based on the detection, at least a group state image including (i) a set of first icon images representing the plurality of first reproduction circuits along with at least (ii) a second icon image connecting each of the first icon images along the periphery of the second icon image icon indicating that the plurality of first reproduction circuits constitute the group, (iii) a third icon image representing an instruction to detect an non-network circuit upon selecting the third icon image and display the detected non-network circuit, and (iv) a fourth icon image outside of the second icon image representing a second reproduction circuit along with a first sub-icon image indicating whether or not the second reproduction circuit is connected to the network and a second sub-icon image indicating whether or not the second reproduction circuit is connected over a near-field communication;
  accept a first user operation from a user, the first user operation including selection of one icon of the set of first icon images of the group,
  determine meta-information of content being commonly reproduced by the plurality of first reproduction circuits, and
  displaying the meta-information in the group state image at a vertical and horizontal center of the second image icon and outside of the set of first icon images in response to the first user operation.

15. A non-transitory computer readable medium storing computer readable instructions thereon that, when executed by a computer, causes the computer to perform a method comprising: detecting a plurality of first reproduction circuits being associated together to constitute a group, each reproduction circuit being connected to a network; displaying, based on the detection, at least a group state image including (i) a set of first icon images representing the plurality of first reproduction circuits along with at least (ii) a second icon image connecting each of the first icon images along the periphery of the second icon image icon indicating that the plurality of first reproduction circuits constitute the group, (iii) a third icon image representing an instruction to detect an non-network circuit upon selecting the third icon image and display the detected non-network circuit, and (iv) a fourth icon image outside of the second icon image representing a second reproduction circuit along with a first sub-icon image indicating whether or not the second reproduction circuit is connected to the network and a second sub-icon image indicating whether or not the second reproduction circuit is connected over a near-field communication;
  accept a first user operation from a user, the first user operation including selection of one icon of the set of first icon images of the group,
  determine meta-information of content being commonly reproduced by the plurality of first reproduction circuits, and
  displaying the meta-information in the group state image at a vertical and horizontal center of the second image icon and outside of the set of first icon images in response to the first user operation.

\* \* \* \* \*